United States Patent [19]
Hiramatsu et al.

[11] Patent Number: 4,903,551
[45] Date of Patent: Feb. 27, 1990

[54] FAILSAFE HYDRAULIC CONTROL SYSTEM FOR VEHICLE AUTOMATIC TRANSMISSION

[75] Inventors: Takeo Hiramatsu, Nagaokakyo; Tsunefumi Niiyama, Kamifukuoka, both of Japan

[73] Assignee: Mitsubishi Jidosha Kogyo Kabushiki Kaisha, Tokyo, Japan

[21] Appl. No.: 158,318

[22] Filed: Feb. 22, 1988

[30] Foreign Application Priority Data

Feb. 25, 1987 [JP] Japan ................... 62-42037

[51] Int. Cl.⁴ .............................................. B60K 41/10
[52] U.S. Cl. ........................................ 74/869; 74/866; 74/878
[58] Field of Search .......................... 74/869, 866, 878

[56] References Cited

U.S. PATENT DOCUMENTS

| 3,684,066 | 8/1972 | Kubo et al. | 192/4 A |
|---|---|---|---|
| 3,754,482 | 8/1973 | Sanders et al. | 74/752 A |
| 4,262,554 | 4/1981 | Ahlen et al. | 74/878 X |
| 4,393,732 | 7/1983 | Suzuki et al. | 74/866 |
| 4,494,423 | 1/1985 | McCarthy et al. | 74/869 |
| 4,527,448 | 7/1985 | Person et al. | 74/869 |
| 4,561,328 | 12/1985 | Hiramatsu | 74/869 |
| 4,628,772 | 12/1986 | Nishikawa et al. | 74/866 |
| 4,729,408 | 3/1988 | Coutant | 74/878 X |
| 4,756,213 | 7/1988 | Mainquist et al. | 74/866 |
| 4,817,474 | 4/1989 | Morisawa | 74/869 |

FOREIGN PATENT DOCUMENTS

| 48-209 | 1/1973 | Japan | 192/4 A |
|---|---|---|---|
| 0233550 | 10/1987 | Japan | 74/866 |
| 2033504 | 5/1980 | United Kingdom | 74/869 |

Primary Examiner—Leslie A. Braun
Assistant Examiner—Harold F. Macris
Attorney, Agent, or Firm—Frishauf, Holtz, Goodman & Woodward

[57] ABSTRACT

A hydraulic control system for a vehicle automatic transmission, in which hydraulic pressure of a pressure source is supplied through a corresponding one of hydraulic lines to each of engaging means when achieving different gear ratios, and a plurality of shift devices are coupled respectively to the lines for switching supply and discharge of the hydraulic pressures to and from the respective engaging means in accordance with running conditions of the vehicle. At least one valve device is coupled to at least one of the lines. The valve device is movable between a supply position where hydraulic pressure is suppled to a corresponding one of the engaging means and a discharge position where the hydraulic pressure suppled to the engaging means is discharged. A plurality of pressure detectors respectively detect hydraulic pressures in the respective hydraulic lines. When the number of engaging means having applied respectively thereto hydraulic pressures higher than their respective predetermined values is equal to or greater than a predetermined value, a switching device switches the valve devices to move same to its discharge position, thereby avoiding locking of the transmission mechanism. A pressure regulating valve device is interposed between the pressure source and a high speed engaging means which can achieve shifting into a high gear ratio.

11 Claims, 6 Drawing Sheets

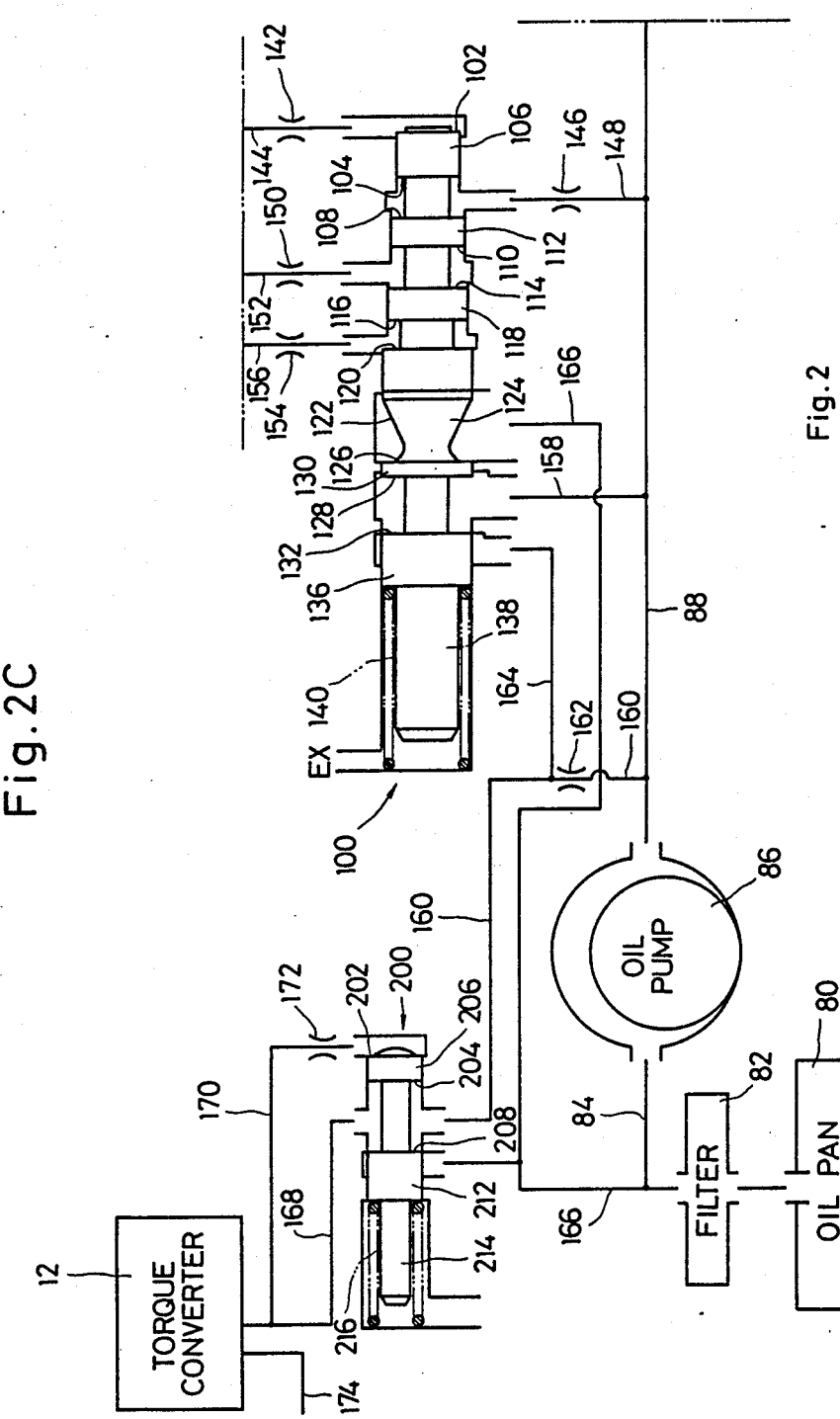

FAILSAFE HYDRAULIC CONTROL SYSTEM FOR VEHICLE AUTOMATIC TRANSMISSION

BACKGROUND OF THE INVENTION

The present invention relates to hydraulic control systems for vehicle automatic transmissions and, more particularly, to a hydraulic control system for a transmission in which a plurality of friction engaging means are selectively engaged by hydraulic pressure, thereby achieving desired gear ratios.

An automatic transmission for a vehicle is known from U.S. Pat. No. 3,754,482, which comprises first, second, third and fourth engaging means. A first shift device is provided in a hydraulic line communicating a source of hydraulic pressure with the first engaging means, for switching supply and discharge of the hydraulic pressure to and from the first engaging means in accordance with running conditions of the vehicle. A second shift device is provided in a hydraulic line communicating the hydraulic pressure source with the second engaging means, for switching supply and discharge of the hydraulic pressure to and from the second engaging means in accordance with the running conditions of the vehicle. A third shift device is provided in a hydraulic line communicating the hydraulic pressure source with the third engaging means, for switching supply and discharge of the hydraulic pressure to and from the third engaging means in accordance with the running conditions of the vehicle. A fourth shift device is provided in a hydraulic line communicating the hydraulic pressure source with the fourth engaging means, for switching supply and discharge of the hydraulic pressure to and from the fourth engaging means in accordance with the running conditions of the vehicle. Two of the first through fourth engaging means are selectively brought to their respective engaged positions, whereby a plurality of gear ratios can be achieved. The arrangement of the automatic transmission disclosed in the above-mentioned U.S. patent is such that supply and discharge of the hydraulic pressure to and from each of the engaging means are switched by ON and OFF operations of a corresponding one of solenoid valves connected respectively to spools of the respective shift devices. Malfunction of the solenoid valves or malfunction of an electronic control system for controlling the solenoid valves would bring one or two engaging means other than a predetermined combination of engaging means to the engaged position or positions simultaneously with movement of the predetermined combination of engaging means to their respective engaged positions. This would cause an inconsistency to occur in a torque transmission path of a gear train in the automatic transmission, so that input and output shafts are locked from rotation or the transmission is damaged. In order to avoid such deficiency, a relay valve is provided in each of the hydraulic lines communicating the hydraulic pressure source with the respective shift devices.

For example, when the solenoid valve is operated, which drives the shift device supplying the hydraulic pressure or line pressure to the 1st gear ratio/reverse engaging means, the line pressure is introduced into the relay valve provided in the hydraulic line between the second shift device and the hydraulic pressure source, to forcibly move the spool of the relay valve to a switching position, thereby intercepting the hydraulic line connecting the hydraulic pressure source to the 2nd gear ratio shift device. This prevents the line pressure from being supplied to the 2nd gear ratio engaging means through the 2nd gear ratio shift device, even if the solenoid valve for driving the 2nd gear ratio shift device is operated due to malfunction or the like of the electronic control system.

Thus, it is possible for the automatic transmission disclosed in the above-mentioned U.S. Pat. No. 3,754,482 to avoid such an inconvenient situation that the hydraulic pressure is simultaneously supplied to the engaging means for achieving their respective gear ratios different from each other so that the gears of the transmission are damaged or locked from rotation.

It is required for the arrangement disclosed in the aforesaid U.S. patent, however, to provide the relay valve in each of the hydraulic lines communicating the hydraulic pressure source with the respective shift devices, in order to achieve the above-mentioned object. By this reason, the hydraulic circuit becomes complicated in structure, and the number of component parts increases, resulting in a rise in the manufacturing cost and in a rise in the probability of occurrence of defects such as valve sticking and the like.

Apart from the above, a technique is known from Japanese Patent Publication No. 48-209 corresponding to U.S. Pat. No. 3,684,066, in which engaging forces acting upon respective engaging means are varied correspondingly to gear ratios. That is, in the low gear ratio in which transmission torque is relatively high, the engaging forces acting on the respective engaging means are raised to increase the torque capacity, while in the high gear ratio in which the transmission torque is relatively low, the engaging forces acting upon the respective engaging means are reduced to bring the torque capacity to a level corresponding to the transmission torque, thereby reducing driving losses of a hydraulic pump.

The arrangement disclosed in the above-mentioned Japanese patent is such that, at shifting of gear ratios, switching is made from relatively high hydraulic pressure supplied to a low speed engaging means to relatively low hydraulic pressure supplied to a high speed engaging means, thereby varying the torque capacity of the engaging means. The arrangement is inconvenient, however, in that shifting shocks occur, because the switching of the hydraulic pressure is made simultaneously with switching of the shift devices, that is, at the early stage of the gear ratio shifting. In order to dissolve the inconvenience, control of the hydraulic pressure supplied to the engaging means for achieving shifting toward the high gear ratio during the gear ratio shifting cannot but become complicated.

OBJECTS AND SUMMARY OF THE INVENTION

It is an object of the invention to provide a hydraulic control system for a vehicle automatic transmission, which can dissolve the above-discussed inconveniences, and which is simple in construction, high in safety, and low in shifting shocks, so that the vehicle is comfortable to ride in.

It is a more specific object of the invention to provide a hydraulic control system for a vehicle automatic transmission, which is provided with a safety mechanism which, with a requisite minimum increase in the number of component parts, can prevent such an inconvenient situation that one or more engaging means other than engaging means to be engaged in order to achieve a required gear ratio are engaged due to malfunction or the like of a control system, to lock a transmission mechanism so that wheels of the vehicle during running are suddenly locked from rotation or the vehicle is made entirely impossible to run.

It is another object of the invention to provide a hydraulic control system for a vehicle automatic transmission, which, with a requisite minimum increase in the number of component parts, can restrain a rise in the manufacturing cost and a rise in the probability of occurrence of defects such as valve sticking and the like in a hydraulic circuit, thereby enabling the hydraulic circuit arrangement to be simplified in construction.

It is still another object of the invention to provide a hydraulic control system for a vehicle automatic transmission, which can bring engaging forces acting upon respective engaging means achieving requisite shifting into their respective gear ratios to respective levels corresponding to the respective gear ratios, to restrain the magnitude of the hydraulic pressure supplied to the engaging means to the requisite minimum, thereby preventing occurrence of noises and reducing losses of the engine output for driving a hydraulic pump, and which is easy in control of the engaging forces during shifting of gear ratios so that an attempt is made to reduce shifting shocks.

According to the invention, there is provided a hydraulic control system for a vehicle automatic transmission which comprises first and second engaging means respectively engagable at different gear ratios, hydraulic pressure supplying means for supplying hydraulic pressure to cause engagement of each of the first and second engaging means, first and second hydraulic passage means for connecting the hydraulic pressure supplying means respectively to the first and second engaging means, and first and second shift means provided respectively in the first and second hydraulic passage means for switching supply and discharge of the hydraulic pressure to and from the respective first and second engaging means in accordance with running conditions of the vehicle.

First and second pressure detecting means of the hydraulic control system respectively detect hydraulic pressure in the first hydraulic passage means between the first shift means and the first engaging means and hydraulic pressure in the second hydraulic passage means between the second shift means and the second engaging means. Valve means is coupled to the first hydraulic passage means between the first pressure detecting means and the first engaging means and is movable between a supply position where the valve means opens the first hydraulic passage means for supplying the hydraulic pressure to be supplied to the first engaging means and a discharge position where the valve means discharges the hydraulic pressure supplied to the first engaging means. Switching means is coupled to the valve means for switching the valve means to move the same to the discharge position when the first pressure detecting means detects that the hydraulic pressure in the first hydraulic passage means is higher than a first predetermined value and the second pressure detecting means detects that the hydraulic pressure in the second hydraulic passage means is higher than a second predetermined value. With such arrangement, it is possible to avoid such an inconvenient situation that a transmission mechanism falls into a locked condition.

Preferably, the valve means comprises a spool valve which includes a spool and a plurality of lands integrally formed on the spool. The lands have their respective pressure receiving sections which include a first pressure receiving section having applied thereto the hydraulic pressure supplied from the first shift means to the first engaging means, for biasing the spool toward the discharge position, a second pressure receiving section having applied thereto the hydraulic pressure supplied from the second shift means to the second engaging means, for biasing the spool toward the discharge position, and a third pressure receiving section having normally applied thereto hydraulic pressure of a predetermined magnitude, for biasing the spool toward the supply position. The spool is switched to the discharge position when the hydraulic pressure acting upon the first pressure receiving section exceeds the first predetermined value and the hydraulic pressure acting upon the second pressure receiving section exceeds the second predetermined value.

According to another aspect of the invention, there is provided a hydraulic control system for a vehicle automatic transmission which comprises first, second and third engaging means, the engaging means being combined to form a plurality of sets of pairs, the engaging means in each set being simultaneously engaged to enable shifting into a plurality of gear ratios corresponding in number to the sets to be achieved, hydraulic pressure supplying means for supplying hydraulic pressure to cause engagement of each of the first, second and third engaging means respectively, first, second and third hydraulic passage means for connecting the hydraulic pressure supplying means respectively to the first, second and third engaging means, and first, second and third shift means coupled respectively to the first, second and third hydraulic passage means for switching supply and discharge of the hydraulic pressure to and from the respective first, second and third engaging means in accordance with running conditions of the vehicle.

First, second and third pressure detecting means of the hydraulic control system respectively detect hydraulic pressure in the first hydraulic passage means between the first shift means and the first engaging means, hydraulic pressure in the second hydraulic passage means between the second shift means and the second engaging means, and hydraulic pressure in the third hydraulic passage means between the third shift means and the third engaging means. Valve means is coupled to the first hydraulic passage means between the first pressure detecting means and the first engaging means and is movable between a supply position where the valve means opens the first hydraulic passage means for supplying the hydraulic pressure to be supplied to the first engaging means and a discharge position where the valve means discharges the hydraulic pressure supplied to the first engaging means. Switching means is coupled to the valve means for switching the valve means to move the same to the discharge position when the first, second and third pressure detecting means simultaneously detect that the hydraulic pressures in the respective first, second and third hydraulic passage means are respectively higher than first, second and third predetermined values.

According to still another aspect of the invention, there is provided a hydraulic control system for a vehicle automatic transmission which comprises first, second and third engaging means respectively engagable when achieving three different forward gear ratios, fourth engaging means engagable when achieving each of three forward gear ratios, hydraulic pressure supplying means for supplying hydraulic pressure to cause engagement of each of the first, second, third and fourth engaging means respectively, first through fourth hydraulic passage means for connecting the hydraulic pressure supplying means respectively to the first through fourth engaging means, and first through third shift means coupled respectively to the first through third hydraulic passage means for switching supply and discharge of the hydraulic pressure to and from the respective first through third engaging means in accordance with running conditions of the vehicle.

First through fourth pressure detecting means of the hydraulic control system respectively detect hydraulic pressure in the first hydraulic passage means between the first shift means and the first engaging means, hydraulic pressure in the second hydraulic passage means between the second shift means and the second engaging means, hydraulic pressure in the third hydraulic passage means between the third shift means and the third engaging means, and hydraulic pressure in the fourth hydraulic passage means. First valve means is provided in a portion of any one of the first, second and third hydraulic passage means, which portion extends between the pressure detecting means coupled to the hydraulic passage means and the engaging means connected to the hydraulic passage means. The first valve means is movable between a supply position where the first valve means opens the hydraulic passage means for supplying the hydraulic pressure to be supplied to the engaging means and a discharge position where the first valve means discharges the hydraulic pressure supplied to the engaging means. Second valve means is provided in a portion of any one of the second, third and fourth hydraulic passage means in which hydraulic passage means the first valve means is not provided. The portion of any one of the second, third and fourth hydraulic passage means extends between the pressure detecting means coupled to the hydraulic passage means and the engaging means connected to the hydraulic passage means. The second valve means is movable between a supply position where the second valve means opens the hydraulic passage means for supplying the hydraulic pressure to be supplied to the engaging means and a discharge position where the second valve means discharges the hydraulic pressure supplied to the engaging means. First switching means is coupled to the first valve means for switching the first valve means to move the same to the discharge position when the pressure detecting means coupled to the hydraulic passage means having provided therein the first valve means among the first, second and third hydraulic passage means detects that the hydraulic pressure in the hydraulic passage means is higher than a predetermined value and the pressure detecting means provided in at least one of the remaining hydraulic passage means detects that the hydraulic pressure in the hydraulic passage means is higher than a predetermined value. Second switching means is coupled to the second valve means for switching the second valve means to move the same to the discharge position when the pressure detecting means provided respectively in the second, third and fourth hydraulic passage means simultaneously detect that the hydraulic pressures in the respective hydraulic passage means are higher than their respective predetermined values.

According to another aspect of the invention, there is provided a hydraulic control system for a vehicle automatic transmission which comprises first through fourth engaging means, hydraulic pressure supplying means for supplying hydraulic pressure to cause engagement of each of the first through fourth engaging means respectively, first through fourth hydraulic passage means for connecting the hydraulic pressure supplying means respectively to the first through fourth engaging means, and first through fourth shift means coupled respectively to the first through fourth hydraulic passage means for switching supply and discharge of the hydraulic pressure to and from the respective first through fourth engaging means in accordance with running conditions of the vehicle, the arrangement being such that a 1st gear ratio is achieved when the first and fourth engaging means are simultaneously engaged, a 2nd gear ratio is achieved when the second and fourth engaging means are simultaneously engaged, a 3rd gear ratio, for example, a directly coupled gear ratio in which an input shaft and an output shaft of the transmission are substantially equal in rotational speed to each other is achieved when the third and fourth engaging means are simultaneously engaged, a 4th gear ratio, for example, an overdrive gear ratio in which the output shaft is higher in rotational speed than the input shaft is achieved when the second and third engaging means are simultaneously engaged.

First through fourth pressure detecting means of the hydraulic control system respectively detect hydraulic pressure in the first hydraulic passage means between the first shift means and the first engaging means, hydraulic pressure in the second hydraulic passage means between the second shift means and the second engaging means, hydraulic pressure in the third hydraulic passage means between the third shift means and the third engaging means, and hydraulic pressure in the fourth hydraulic passage means between the fourth shift means and the fourth engaging means. First valve means is provided in a portion of any one of the first, second and third hydraulic passage means, which portion extends between the pressure detecting means coupled to the hydraulic passage means and the engaging means connected to the hydraulic passage means. The first valve means is movable between a supply position where the first valve means opens the hydraulic passage means for supplying the hydraulic pressure to be supplied to the engaging means and a discharge position where the first valve means discharges the hydraulic pressure supplied to the engaging means. Second valve means is provided in a portion of any one of the second, third and fourth hydraulic passage means in which hydraulic passage means the first valve means is not provided. The portion of any one of the second, third and fourth hydraulic passage means extends between the pressure detecting means coupled to the hydraulic passage means and the engaging means connected to the hydraulic passage means. The second valve means is movable between a supply position where the second valve means opens the hydraulic passage means for supplying the hydraulic pressure to be supplied to the engaging means and a discharge position where the second valve means discharges the hydraulic pressure supplied to the engaging means. First switching means is coupled to the first valve means for switching the first valve means to move the same to the discharge position when the pressure detecting means coupled to the hydraulic passage means having provided therein the first valve means detects that the hydraulic pressure in the hydraulic passage means is higher than a predetermined value and the pressure detecting means coupled to at least one of the remaining hydraulic passage means detects that the hydraulic pressure in the hydraulic passage means is higher than a predetermined value. Second switching means is coupled to the second valve means for switching the second valve means to move the same to the discharge position when the pressure detecting means coupled respectively to the second, third and fourth hydraulic passage means simultaneously detect that the hydraulic pressures in the respective hydraulic passage means are higher than their respective predetermined values.

According to still another aspect of the invention, there is provided a hydraulic control system for a vehicle automatic transmission which comprises a plurality of engaging means including low speed engaging means for achieving a relatively low gear ratio and high speed engaging means for achieving a relatively high gear ratio, and first hydraulic pressure supplying means for supplying the hydraulic pressure to cause engagement of each of the engaging means.

Second hydraulic pressure supplying means of the hydraulic control system generates a signal hydraulic pressure. Pressure regulating valve means is arranged between the high speed engaging means and the first hydraulic pressure supplying means for reducing the hydraulic pressure supplied to the high speed engaging means when the signal hydraulic pressure is supplied from the second hydraulic pressure supplying means. Switching valve means is provided which is movable between a supply position where the switching valve means enables the signal hydraulic pressure of the second hydraulic pressure supplying means to be supplied to the pressure regulating valve means and a discharge position where the switching valve means discharges the signal hydraulic pressure supplied to the pressure regulating valve means. The arrangement is such that the switching valve means is switched to the supply position when the hydraulic pressure supplied from the first hydraulic pressure supplying means to the high speed engaging means is higher than a predetermined value. With such arrangement, losses of the engine output for causing the hydraulic pressure supplying means to generate the supply hydraulic pressure are reduced, whereby an attempt can be made to reduce shifting shocks.

The above and other objects, features and advantages of the invention will become more apparent from the ensuing detailed description taken in conjunction with the accompanying drawings.

BRIEF DESCRIPTION OF THE DRAWINGS

FIGS. 2, 2A, 2B and 2C are hydraulic circuit diagrams of the hydraulic control system for the vehicle automatic transmission according to the invention, FIG. 2 showing the arrangement of FIGS. 2A–2C relative to each other.

DETAILED DESCRIPTION

Figure 1:
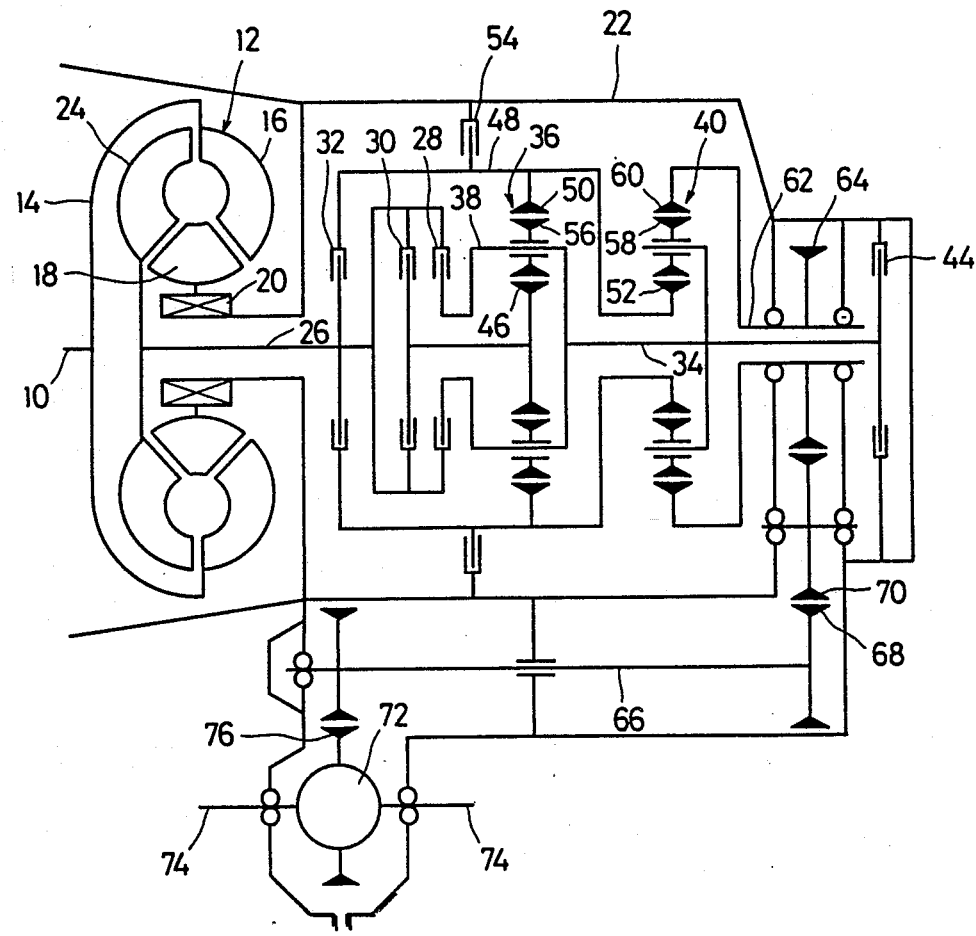
FIG. 1 is a diagrammatic view of a power train of a vehicle automatic transmission to which a hydraulic control system according to the invention is applied.

FIG. 1 is a skeletal view showing a speed change gear of an automatic transmission which can achieve shifting into gear ratios including four forward gear ratios and one reverse gear ratio. The speed change gear comprises a drive shaft 10 which is adapted to be connected directly to a crankshaft of an engine (not shown). The drive shaft 10 is connected to a pump 16 of a torque converter 12 through an input casing 14 thereof. The torque converter 12 has a stator 18 which is connected to a transmission casing 22 through a one-way clutch 20. The torque converter 12 also has a turbine 24 which is connected, through an input shaft 26, to an overdrive clutch 28 serving as a third engaging means, an underdrive clutch 30 serving as a fourth engaging means, and a reverse clutch 32. The overdrive clutch 28 has an output side which is connected to a first carrier 38 of first simple planetary gears 36 (hereinafter, referred to simply as "first gear unit 36"). The first carrier 38 is connected to a second carrier 42 of second simple planetary gears 40 (hereinafter, referred to simply as "second gear unit 40") through a first intermediate shaft 34, and is rotatable together with the second carrier 42. The first carrier 38 is also connected, through the intermediate shaft 34, to a low/reverse brake 44 serving as a first engaging means for stopping rotation of the intermediate shaft 34. The underdrive clutch 30 has an output side which is connected to a first sun gear 46 of the first gear unit 36. The reverse clutch 32 has an output side which is connected to a first ring gear 50 of the first gear unit 36 and to a second sun gear 52 of the second gear unit 40 through a second intermediate shaft 48. The output side of the reverse clutch 32 is also connected to a 2-4 brake 54 serving as a second engaging means for stopping rotation of the second intermediate shaft 48.

The first gear unit 36 is composed of the above-mentioned first sun gear 46, a first pinion gear 56 in mesh with the sun gear 46, the first carrier 38 which rotatably supports the pinion gear 56 and which is rotatable per se, and the above-mentioned first ring gear 50 in mesh with the first pinion gear 56. The second gear unit 40 is composed of the above-mentioned second sun gear 52, a second pinion gear 58 in mesh with the sun gear 52, the above-mentioned second carrier 42 which rotatably supports the pinion gear 58 and which is rotatable per se, and a second ring gear 60 in mesh with the second pinion gear 58. The second ring gear 60 is connected to an output gear 64 through a hollow output shaft 62 through which the first intermediate shaft 34 extends.

The output gear 64 is in mesh with a driven gear 68 through an idler 70. The driven gear 68 is mounted on a right-hand end of an intermediate transmission shaft 66 which is arranged substantially in parallel relation to the input shaft 26. The intermediate transmission shaft 66 has a left-hand end thereof which is connected to a final reduction gear 76 which is in turn connected to a drive axle 74 through a differential gear unit 72.

As will be clear from FIG. 1, the transmission casing 22 is so formed as to enclose various power transmission means from the torque converter 12 to the output shaft 64, as well as the intermediate transmission shaft 66, the differential gear unit 72 and the like.

The above-described clutches and brakes are provided with their respective engaging piston devices, servo devices or the like, and are movable between respective engaged positions and respective released or disengaged positions, in response to supply and discharge of hydraulic pressure. The hydraulic pressure is supplied by a hydraulic control system illustrated in FIG. 2, selectively to the clutches and brakes. Operative combinations of the clutches and brakes enable shifting into four forward gear ratios and one reverse gear ratio to be achieved.

The below table 1 indicates the relationship between operations of the clutches and brakes and shifting of gear ratios. In the table 1, the symbol "o" represents engagement of the clutches and brakes, while the symbol "—" represents release thereof.

TABLE 1

| Gear Ratio | 1st | 2nd | 3rd | 4th | Reverse |
|---|---|---|---|---|---|
| Reverse Cluth 32 | — | — | — | — | o |
| Low/Reverse Brake 44 | o | — | — | — | o |
| 2-4 Brake 54 | — | o | — | o | — |
| Underdrive Clutch 30 | o | o | o | — | — |
| Overdrive Clutch 28 | — | — | o | o | — |

In the arrangement described above, as the low/-reverse brake 44 and the underdrive clutch 30 are brought to their respective engaged positions, the first and second carriers 38 and 42 are fixed and serve respectively as reaction elements. Thus, the driving force from the drive shaft 10 is transmitted to the output shaft 62 through the torque converter 12, the input shaft 26, the underdrive clutch 30, the first sun gear 46, the first pinion gear 56, the first ring gear 50, the second sun gear 52, the second pinion gear 58 and the second ring gear 60. The drive force is further transmitted to the drive axle 74 through the output gear 64, the intermediate transmission shaft 66 and the final reduction gear 76, so that shifting into the 1st gear ratio is achieved, as will also be apparent from the table 1.

As the brake 44 is released and the brake 54 is brought to its engaged position while the underdrive clutch 30 is maintained engaged, the first ring gear 50 and the second sun gear 52 are stopped in rotation and serve respectively as reaction elements. Thus, the driving force is transmitted to the output gear 64 through the first sun gear 46, the first carrier 38, the second carrier 42, the second ring gear 60 and the output shaft 62, so that shifting into the 2nd gear ratio is achieved.

As the 2-4 brake 54 is released and the overdrive clutch 28 is brought to its engaged position while the underdrive clutch 30 is maintained engaged, the first sun gear 46 and the first carrier 38 rotate together, so that the entire component parts of the first gear unit 36 rotate together. Accordingly, the second sun gear 52 and the second carrier 42 rotate together, so that the entire component parts of the second gear unit 40 also rotate together. Thus, shifting into the 3rd gear ratio is achieved in which the input shaft 26 and the output shaft 64 are brought to the same rotational speed.

As the underdrive clutch 30 is released and the 2-4 brake 54 is brought to its engaged position while the overdrive clutch 28 is maintained engaged, the second sun gear 52 serves as a reaction element, so that the driving force is transmitted to the second carrier 42 through the first intermediate shaft 34. The second pinion gear 58 moves around the second sun gear 52 while rotating about an axis of the second pinion gear 58, whereby the driving force is further transmitted to the output gear 64 through the output shaft 62. Thus, shifting into the overdrive 4th gear ratio is achieved in which rotation of the output gear 64 is faster than that of the input shaft 26.

As the overdrive clutch 28 and the 2-4 brake 54 are released from engagement and the reverse clutch 32 and the low/reverse brake 44 are brought to their respective engaged positions, the second carrier 42 serves as a reaction element, so that the driving force is transmitted to the output gear 64 through the second intermediate shaft 48, the second sun gear 52, the second pinion gear 58, the second ring gear 60 and the output shaft 62. Thus, shifting into the reverse gear ratio is achieved.

The speed change gear illustrated in FIG. 1 has associated therewith a hydraulic control system for achieving shifting into the various gear ratios indicated in the table 1. The arrangement and operation of the hydraulic control system will next be described with reference to FIG. 2.

Figure 2A:
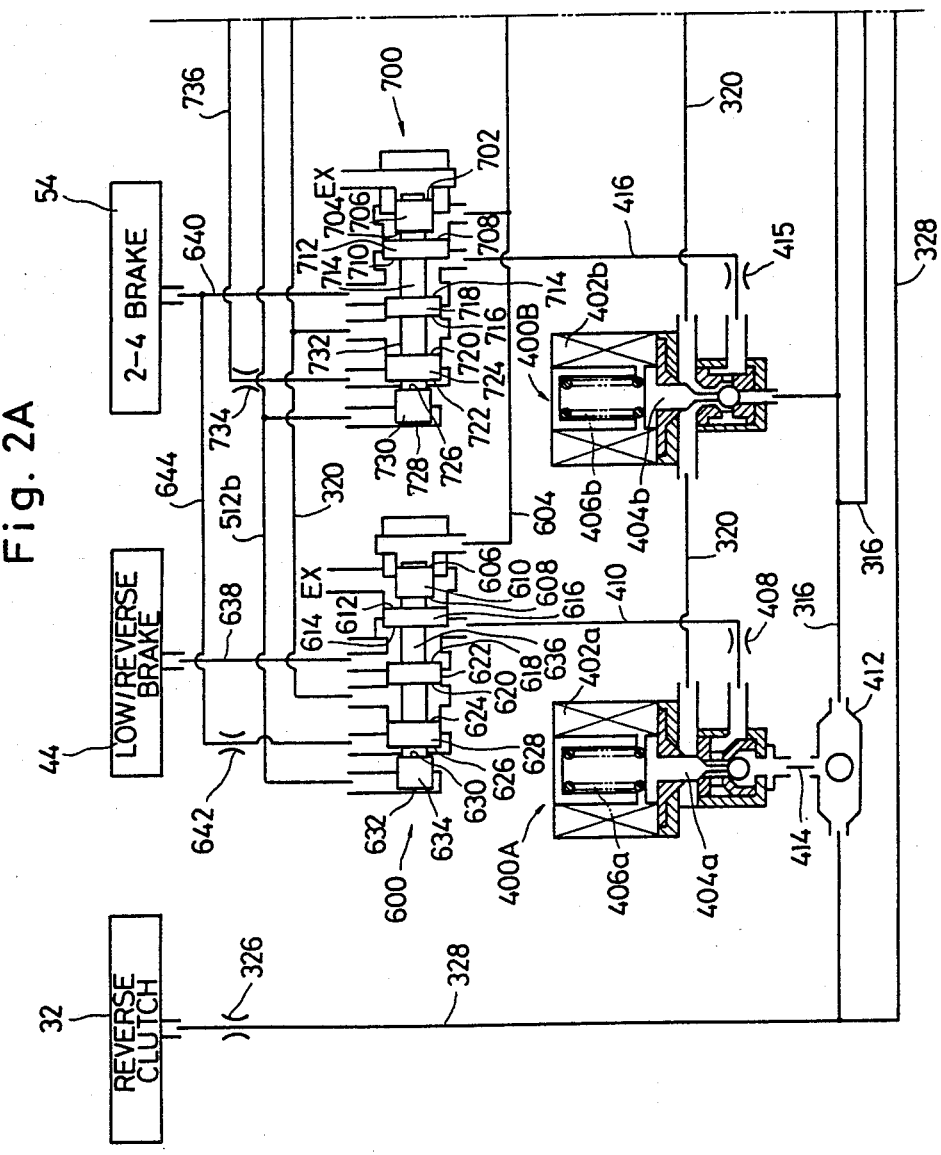
Figure 2B:
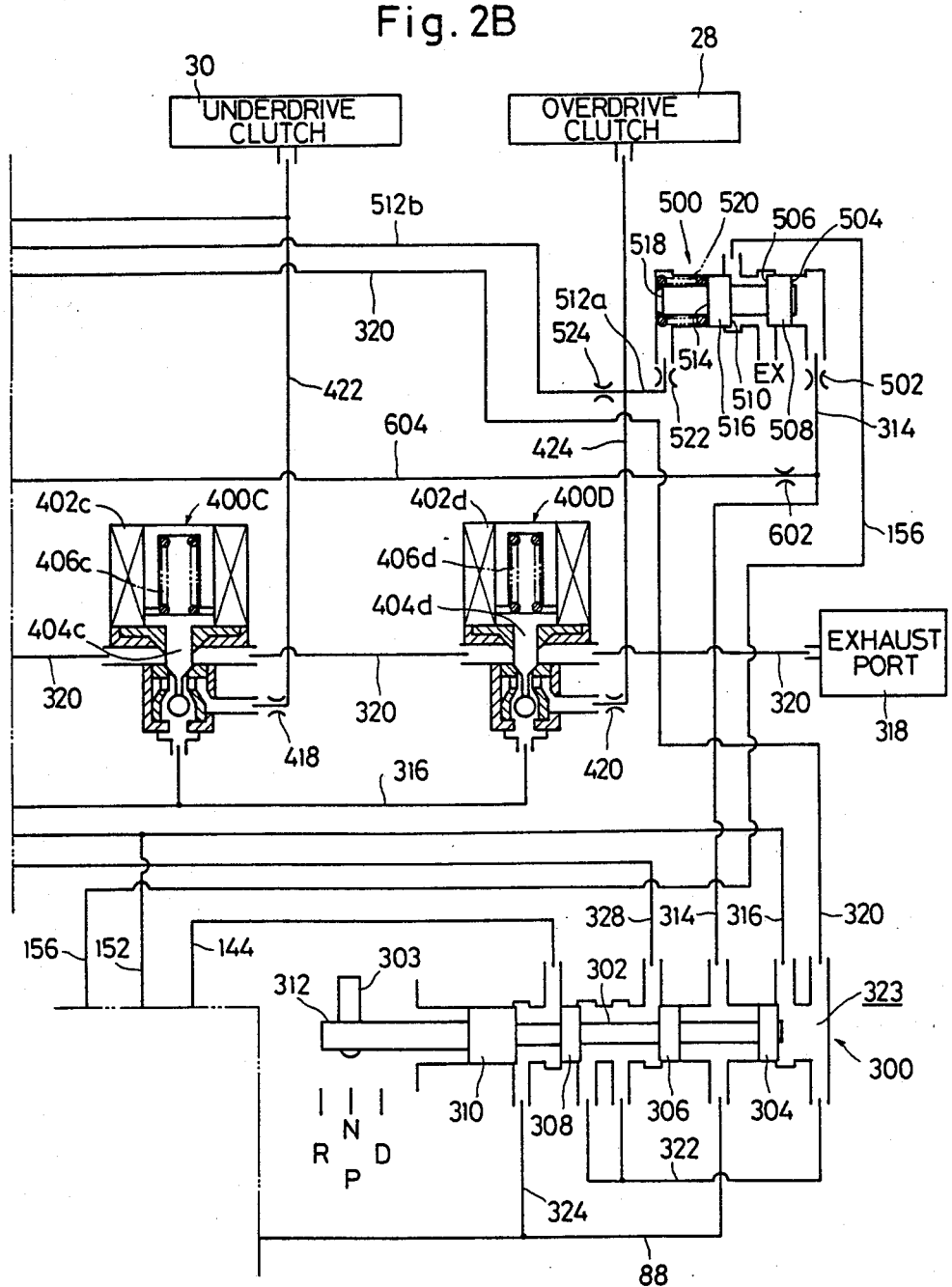

The hydraulic control system shown in FIG. 2 is designed to control hydraulic pressure supplied to the torque converter 12, and hydraulic pressure supplied to each of the clutches 28, 30 and 32 and the brakes 44 and 54 of the speed change gear shown in FIG. 1, in accordance with running conditions of a vehicle. The hydraulic control system comprises primary component parts including an oil pump 86, a pressure regulating valve 100, a torque converter control valve 200, a manually operated valve 300, a first solenoid valve 400A serving as first shift means, a second solenoid valve 400B serving as second shift means, a third solenoid valve 400C serving as fourth shift means, a fourth solenoid valve 400D serving as third shift means, a line pressure switching valve 500, a first fail-safe valve 600 serving as first valve means, and a second fail-safe valve 700 serving as second valve means. These component parts are connected to each other by hydraulic lines.

The oil pump 86 is adapted to draw hydraulic fluid reserved in an oil pan 80 through a filter 82 and a hydraulic line 84.. The drawn hydraulic fluid is pressurized by the oil pump 86 and is discharged into a hydraulic line 88.

The pressure regulating valve 100 is designed to regulate the hydraulic pressure or line pressure in the hydraulic line 88 to desirable values corresponding respectively to the gear ratios. The pressure regulating valve 100 is composed of a spool 138 formed with six lands 106, 112, 118, 124, 130 and 136, and a spring 140 which is abutted against the land 136 for biasing the spool 138 to the right as viewed in FIG. 2. The land 106 has a pair of pressure receiving faces 102 and 104. The land 112 has a pressure receiving face 108 confronted with the pressure receiving face 104, and a pressure receiving face 110. The land 118 has a pressure receiving face 114 confronted with the pressure receiving face 110, and a pressure receiving face 116. The land 124 has a pressure receiving face 120 confronted with the pressure receiving face 116, and a pressure receiving face 122. The land 130 has a pressure receiving face 126 substantially confronted with the pressure receiving face 122, and a pressure receiving face 128. The land 136 has a pressure receiving face 132 confronted with the pressure receiving face 128. The pressure receiving face 108 has a pressure receiving area larger than that of the pressure receiving face 104. The pressure receiving face 114 has a pressure receiving area larger than that of the pressure receiving face 110. The pressure receiving face 120 has a pressure receiving area larger than that of the pressure receiving face 116. The pressure receiving faces 122 and 126 have the same pressure receiving area. The pressure receiving faces 128 and 132 have the same pressure receiving area.

A hydraulic line 144 having provided therein an orifice 142 always communicates with a pressure space facing the pressure receiving face 102. The hydraulic line 88 always communicates with a space defined between the pressure receiving faces 104 and 108, through a hydraulic line 148 having provided therein an orifice 146. A hydraulic line 152 having provided therein an orifice 150 always communicates with a space defined between the pressure receiving faces 110 and 114. A hydraulic line 156 having provided therein an orifice 154 always communicates with a space defined between the pressure receiving faces 116 and 120. The hydraulic line 88 always communicates with a space defined between the pressure receiving faces 128 and 132, through a hydraulic line 158. The hydraulic line 84 always communicates with a space defined between the pressure receiving faces 122 and 126, through a hydraulic line 166. When the spool 138 moves to the left as viewed in FIG. 2, the space defined between the pressure receiving faces 128 and 132 is brought into communication with a hydraulic line 164 which communicates with a downstream side of an orifice 162 provided in a hydraulic line 160.

The torque converter control valve 200 is composed of a spool 214 formed with two lands 206 and 212, and a spring 216 abutted against the land 212 for biasing the spool 214 to the right as viewed in FIG. 2. The land 206 has a pair of pressure receiving faces 202 and 204. The land 212 has a pressure receiving face 208 which is confronted with the pressure receiving face 204 and which is the same in pressure receiving area as the pressure receiving face 204. The hydraulic pressure in the hydraulic line 88 regulated in pressure by the pressure regulating valve 100 is applied to the pressure receiving face 202 through the hydraulic line 160, a hydraulic line 168 and a hydraulic line 170 having provided therein an orifice 172. The spool 214 moves to a position where the pressure acting upon the pressure receiving face 202 and the biasing force of the spring 216 balance with each other, thereby regulating the hydraulic fluid discharged to the hydraulic line 168 to a predetermined pressure. The hydraulic fluid regulated to the predetermined pressure is supplied to the torque converter 12 through the hydraulic line 168. The hydraulic fluid discharged from the torque converter 12 is supplied to various lubricating sections of the transmission through a hydraulic line 174.

The manually operated valve 300 comprises a spool 302 movable to a selected one of three positions including a reverse position R, a neutral or parking position N/P and a drive position D. The spool 302 is formed with four lands 304, 306, 308 and 310 and a coupling member 303 which is mechanically or electrically connectable to a conventionally known selector lever (not shown) arranged within the vehicle compartment for setting the spool 302 to a desired position. The selector lever is usually movable among a P position for parking, an R position for reverse, an N position for stoppage, a D4 position where shifting is made possible among 1st through 4th forward gear ratios, a D3 position where shifting is made possible among 1st through 3rd forward gear ratios, a D2 position where shifting into gear ratios equal to or higher than the 3rd gear ratio is prohibited, and an L position where shifting into gear ratios equal to or higher than the 2nd gear ratio is prohibited. As the selector lever is operated to select any one of the D4, D3, D2 and L positions, the spool 302 is moved to the D position. In the D position, the hydraulic line 88 is brought into communication with a hydraulic line 314 and with a hydraulic line 316 leading to the solenoid valves, through a space defined between the lands 304 and 306. Also, in the D position, the hydraulic line 144 is brought into communication with an exhaust line 320 leading to an exhaust port 318, through a space between the lands 308 and 310, a hydraulic line 322, and a hydraulic pressure chamber 323 on the right-hand side of the land 304. Communication of the hydraulic line 88 with the hydraulic line 316 through the manually operated valve 300 causes the hydraulic pressure in the hydraulic line 88 to be supplied to the clutches 28 and 30 and the brakes 44 and 54, in accordance with combinations in energization and deenergization of the first solenoid valve 400A, the second solenoid valve 400B, the third solenoid valve 400C and the fourth solenoid valve 400D, subsequently to be described in detail. In this manner, the speed change gear illustrated in FIG. 1 is switched to one of the forward gear ratios which corresponds to a selected position of the selector lever and to the running conditions of the vehicle.

As the selector lever is selectively moved to the P position or the N position, the spool 302 is moved to the N/P position. In the N/P position, the hydraulic line 88 is brought into communication with the hydraulic line 144 through a hydraulic line 324 and the space between the lands 308 and 310. The hydraulic line 88 is also brought into communication with the hydraulic line 314 through the space between the lands 304 and 306. A hydraulic line 328 having provided therein an orifice 326 and connected to the reverse clutch 32 is brought into communication with the exhaust line 320 through a space between the lands 306 and 308, the hydraulic line 322 and the hydraulic chamber 323. Further, the hydraulic line 316 is also brought into communication with the exhaust line 320. Thus, the neutral state is achieved.

As the selector lever is selectively moved to the R position, the spool 302 is moved to the R position. In the R position, the hydraulic line 88 is brought into communication with the hydraulic lines 314 and 328 through the space between the lands 304 and 306. In addition, the hydraulic line 144 is brought into communication with the exhaust line 320 through the space between the lands 306 and 308, the hydraulic line 322 and the hydraulic pressure chamber 323. The hydraulic line 316 is also brought into communication with the exhaust line 320. Thus, shifting into the reverse gear ratio is achieved in the speed change gears, subsequently to be described.

The first solenoid valve 400A is a three-way valve of normally open type. The first solenoid valve 400A has incorporated therein a coil $402a$, a valve member $404a$ and a spring $406a$ biasing the valve member $404a$ toward its open position. In a state in which the coil $402a$ is deenergized, the valve member $404a$ intercepts communication between the exhaust line 320 and a hydraulic line 410 having provided therein an orifice 408 and connected to the first fail-safe valve 600 subsequently to be described in detail. In addition, the valve member $404a$ brings the hydraulic line 410 into communication with a hydraulic line 414 into which the hydraulic pressure in the hydraulic line 316 or 328 is introduced through a check valve 412. In a state in which the coil $402a$ is energized, the valve member $404a$ intercepts communication between the hydraulic lines 410 and 414, and brings the hydraulic line 410 into communication with the exhaust line 320.

The second solenoid valve 400B is a three-way valve of normally closed type. The second solenoid valve 400B has incorporated therein a coil $402b$, a valve member $404b$, and a spring $406b$ biasing the valve member 404b toward its closed position. In a state in which the coil 402b is deenergized, the valve member 404b intercepts communication between the hydraulic line 316 and a hydraulic line 416 having provided therein an orifice 415 and connected to the second fail-safe valve 700 subsequently to be described in detail. In addition, the valve member 404b brings the hydraulic line 416 into communication with the exhaust line 320. In a state in which the coil 402b is energized, the valve member 404b intercepts communication between the exhaust line 320 and the hydraulic line 416, and brings the hydraulic line 416 into communication with the hydraulic line 316.

Each of the third and fourth solenoid valves 400C and 400D is a three-way valve of normally open type similar to the first solenoid valve 400A. The third and fourth solenoid valves 400C and 400D have incorporated respectively therein coils 402c and 402d, valve members 404c and 404d, and springs 406c and 406d biasing the respective valve members 404c and 404d toward their respective open positions. In a state in which the coil 402c of the third solenoid valve 400C is deenergized, the valve member 404c intercepts communication between the exhaust line 320 and a hydraulic line 422 having provided therein an orifice 418 and connected to the underdrive clutch 30. In addition, the valve member 404c brings the hydraulic line 422 into communication with the hydraulic line 316. In a state in which the coil 402c is energized, the valve member 404c brings the exhaust line 320 into communication with the hydraulic line 422, and intercepts communication between the hydraulic line 422 and the hydraulic line 316. On the other hand, in a state in which the coil 402d of the fourth solenoid valve 400D is deenergized, the valve member 404d intercepts communication between the exhaust line 320 and a hydraulic line 424 having provided therein an orifice 420 and connected to the overdrive clutch 28. In addition, the valve member 404d brings the hydraulic line 424 into communication with the hydraulic line 316. In a state in which the coil 402d is energized, the valve member 404d brings the exhaust line 320 into communication with the hydraulic line 424, and intercepts communication between the hydraulic line 424 and the hydraulic line 316.

The first through fourth solenoid valves 400A through 400D are operative in response to electric signals from an electronic control system (not shown). The below table 2 indicates the relationship between the gear ratios and combinations in "ON" (energization) and "OFF" (deenergization) of the first through fourth solenoid valves 400A, 400B, 400C and 400D. In the table 2, the symbol "—" represents that the solenoid valve may be in either one of the ON and OFF positions.

TABLE 2

| Gear Speed | First Solenoid Valve 400 A | Second Solenoid Valve 400 B | Third Solenoid Valve 400 C | Fourth Solenoid Valve 400 D |
| --- | --- | --- | --- | --- |
| 1st | OFF | OFF | OFF | ON |
| 2nd | ON | ON | OFF | ON |
| 3rd | ON | OFF | OFF | OFF |
| 4th | ON | ON | ON | OFF |
| Reverse | OFF | — | — | — |

The line pressure switching valve 500 is provided for switching the line pressure to values corresponding respectively to the gear ratios, and is composed of a spool 518 and a spring 520. The spool 518 is formed with a land 508 having a pair of pressure receiving faces 504 and 506, and a land 516 having a pair of pressure receiving faces 510 and 514. The pressure receiving face 510 is confronted with the pressure receiving face 506 and has a pressure receiving area the same as that of the pressure receiving face 506. The hydraulic pressure in the hydraulic line 314 having provided therein an orifice 502 is applied to the pressure receiving face 504. The hydraulic pressure in a hydraulic line 512a branching from the hydraulic line is applied to the pressure receiving face 514. The spring 520 is abutted against the pressure receiving face 514 to bias the spool 518 to the right as viewed in FIG. 2.

When the hydraulic pressure is supplied to the hydraulic line 314, but is not supplied to the hydraulic line 512a, the pressure acting upon the pressure receiving face 504 overcomes the biasing force of the spring 520 to displace the spool 518 to the left as viewed in FIG. 2. Thus, communication between the hydraulic line 156 and the hydraulic line 512a is intercepted, and the hydraulic line 156 is brought into communication with an exhaust port through a space defined between the lands 508 and 516. When no hydraulic pressure is supplied to both the hydraulic lines 512a and 314, or when the hydraulic pressure is supplied only to the hydraulic line 512a, the spool 518 is displaced to the right as viewed in FIG. 2 under the biasing force of the spring 520 or under the biasing force thereof and the pressure acting upon the pressure receiving face 514, to bring the hydraulic line 156 into communication with the hydraulic line 512a through a hydraulic pressure chamber on the left-hand side of the land 516. The hydraulic line 512a has provided therein an orifice 522. An orifice 524 is provided in another hydraulic line 512b branching from the hydraulic line 424. The hydraulic line 512b is connected to the first fail-safe valve 600 and the second fail-safe valve 700 subsequently to be described in detail.

The first fail-safe valve 600 has a spool 636 formed with five lands 610, 616, 622, 628 and 634. The land 610 has a pair of pressure receiving faces 606 and 608. The land 616 has a pressure receiving face 612 confronted with the pressure receiving face 608 and has a pressure receiving area larger than that of the pressure receiving face 608. The land 616 also has a pressure receiving face 614. The land 622 has a pressure receiving face 618 confronted with the pressure receiving face 614 and has a pressure receiving area smaller than that of the pressure receiving face 614. The land 622 also has a pressure receiving face 620. The land 628 has a pressure receiving face 624 confronted with the pressure receiving face 620 and has a pressure receiving area the same as that of the pressure receiving face 620. The land 628 also has a pressure receiving face 626. The land 634 has a pressure receiving face 630 confronted with the pressure receiving face 626 and has a pressure receiving area smaller than that of the pressure receiving face 626. The land 634 also has a pressure receiving face 632. Hydraulic pressure in a hydraulic line 604 having provided therein an orifice 602 and branching from the hydraulic line 314 is applied to the pressure receiving face 606. The hydraulic pressure in the hydraulic line 512b is applied to the pressure receiving face 632. The hydraulic pressure in the hydraulic line 410 is applied to the pressure receiving faces 614 and 618. Hydraulic pressure in a hydraulic line 644 having provided therein an orifice 642 is applied to the pressure receiving faces 626 and 630. The hydraulic line 644 branches from a hydraulic line 640 for supplying the hydraulic pressure to the 2-4 brake 54.

Only when the hydraulic pressure in the hydraulic line 604 is applied to the pressure receiving face 606 and the hydraulic pressure in the hydraulic line 410 is applied to the pressure receiving faces 614 and 618, the spool 636 is retained at the left-hand end position in FIG. 2 so that the hydraulic line 410 is maintained in communication with a hydraulic line 638 for supplying the hydraulic pressure to the low/reverse brake 44. On the other hand, when the hydraulic pressure in the hydraulic line 604 is applied to the pressure receiving face 606 and the hydraulic pressure in the hydraulic line 410 is applied to the pressure receiving faces 614 and 618 and, in addition thereto, when the hydraulic pressure is introduced into at least one of the hydraulic line 644 and the hydraulic line 512b (which communicates with the hydraulic line 424 for supplying the hydraulic pressure to the overdrive clutch 28) so that the hydraulic pressure is applied to at least one of the pressure receiving faces 626 and 632, the spool 636 is displaced to the right as viewed in FIG. 2 to bring the hydraulic line 638 into communication with the exhaust line 320 through a space between the lands 622 and 628 thereby releasing the low/reverse brake 44 in a moment. A space between the lands 610 and 616 communicates with an exhaust port.

As will be appreciated from the above, the pressure receiving faces 614 and 618 serve as detecting means for detecting the hydraulic pressure supplied from the hydraulic line 410 to the low/reverse brake 44. The pressure receiving faces 626 and 630 serve as detecting means for detecting the hydraulic pressure supplied from the hydraulic lines 416 and 640 to the 2-4 brake 54. The pressure receiving face 632 serves as detecting means for detecting the hydraulic pressure supplied from the hydraulic line 424 to the overdrive clutch 28. In addition, the above-described various pressure receiving faces also serve as switching means for switching the positions of the spool 636.

The second fail-safe valve 700 has a spool 732 formed with five lands 706, 712, 718, 724 and 730. The land 706 has a pair of pressure receiving faces 702 and 704. The land 712 has a pressure receiving face 708 confronted with the pressure receiving face 704 and has a pressure receiving area larger than that of the pressure receiving face 704. The land 712 also has a pressure receiving face 710. The land 718 has a pressure receiving face 714 confronted with the pressure receiving face 710 and has a pressure receiving area smaller than that of the pressure receiving face 710. The land 718 also has a pressure receiving face 716. The land 724 has a pressure receiving face 720 confronted with the pressure receiving face 716 and has a pressure receiving area the same as that of the pressure receiving face 716. The land 724 also has a pressure receiving face 722. The land 730 has a pressure receiving face 726 confronted with the pressure receiving face 722 and has a pressure receiving area smaller than that of the pressure receiving face 722. The land 730 also has a pressure receiving face 728. The hydraulic pressure in the hydraulic line 604 is applied to the pressure receiving faces 704 and 708. The hydraulic pressure in the hydraulic line 416 is applied to the pressure receiving faces 710 and 714. Hydraulic pressure in a hydraulic line 736 having provided therein an orifice 734 and branching from the hydraulic line 422 is applied to the pressure receiving faces 722 and 726. The hydraulic pressure in the hydraulic line 512b is applied to the pressure receiving face 728.

When the hydraulic pressure in the hydraulic line 604 is introduced to the pressure receiving faces 704 and 708 and the hydraulic pressure in the hydraulic line 416 is introduced to the pressure receiving faces 710 and 714 and, simultaneously, when the hydraulic pressure in only one of the hydraulic lines 512b and the hydraulic line 736 is introduced to the pressure receiving face 728 or the pressure receiving faces 722 and 726, the difference in area among the pressure receiving faces having applied thereto their respective hydraulic pressures causes the spool 732 to be maintained at the left-hand end position in FIG. 2, thereby maintaining the hydraulic line 416 in communication with the hydraulic line 640 for supplying the hydraulic pressure to the 2-4 brake 54, through a space defined between the lands 712 and 718. As the hydraulic pressure in the hydraulic line 604 is introduced to the pressure receiving faces 704 and 708 and the hydraulic pressure in the hydraulic line 416 is introduced to the pressure receiving faces 710 and 714 and, simultaneously, as both the hydraulic pressure in the hydraulic line 512b and the hydraulic pressure in the hydraulic line 736 are introduced respectively to the pressure receiving face 728 and the pressure receiving faces 722 and 726, the spool 732 is displaced to the right as viewed in FIG. 2 to bring the hydraulic line 640 into communication with the exhaust line 320 through a space between the lands 718 and 724, thereby releasing the 2-4 brake 54 in a moment. A hydraulic pressure chamber on the right-hand side of the land 706 communicates with an exhaust port.

As will be appreciated from the above, the pressure receiving faces 710 and 714 serve as detecting means for detecting the hydraulic pressure supplied from the hydraulic line 416 to the 2-4 brake 54. The pressure receiving faces 722 and 726 serve as detecting means for detecting the hydraulic pressure supplied from the hydraulic line 422 to the underdrive clutch 30. The pressure receiving face 728 serves as detecting means for detecting the hydraulic pressure supplied from the hydraulic line 424 to the overdrive clutch 28. In addition, the above-described various pressure receiving faces also serve as switching means for switching the positions of the spool 732.

The first and second fail-safe valves 600 and 700 serve as follows. That is, even if one or more solenoid valves malfunction when shifting to a certain forward gear ratio has been achieved, the first and second fail-safe valves 600 and 700 prevent occurrence of such a situation that three or more engaging means are simultaneously brought to their respective engaged positions causing the transmission to be locked, and the first and second fail-safe vales 600 and 700 forcibly shift the forward gear ratio to the 2nd, 3rd or 4th gear ratio to enable the vehicle to run.

The operation of the hydraulic control system constructed as above will next be described.

As a driver moves the selector lever arranged within the vehicle compartment, to select one of the P and N positions, the spool 302 of the manually operated valve 300 mechanically or electrically connected to the selector lever is also moved to the P/N position in interlocked relation to the selector lever. As the engine is started, the hydraulic fluid pressurized by the oil pump 86 is discharged into the hydraulic line 88 so that the hydraulic pressure is generated in the hydraulic line 88. The hydraulic pressure in the hydraulic line 88 is applied to the pressure receiving faces 104 and 108 of the pressure regulating valve 100 through the hydraulic line 148, and is also applied to the pressure receiving face 102 of the pressure regulating valve 100 through the hydraulic line 324, the space between the lands 308 and 310 of the manually operated valve 300, and the hydraulic line 144. The spool 138 of the pressure regulating valve 100 is stabilized at a position where the pressures acting upon the respective pressure receiving faces balance with the biasing force of the spring 140. A part of the hydraulic pressure introduced into the space between the lands 130 and 136 through the hydraulic line 158 is discharged to the hydraulic lines 164 and 166, so that the hydraulic pressure in the hydraulic line 88 is regulated to a predetermined lowest pressure (hereinafter, referred to as "first line pressure"). The hydraulic fluid in the hydraulic lines 88 and 164 is introduced into the torque converter control valve 200 through the hydraulic line 160. The above-described hydraulic pressure control operation of the torque converter control valve 200 causes the hydraulic fluid of a predetermined pressure to be supplied to the torque converter 12 through the hydraulic line 168. Further, the hydraulic pressure in the hydraulic line 88 is introduced into a right-hand end hydraulic pressure chamber of the line pressure switching valve 500 and into the hydraulic line 604 through the space between the lands 304 and 306 of the manually operated valve 300 and through the hydraulic line 314. The hydraulic pressure introduced into the right-hand end hydraulic pressure chamber of the line pressure switching valve 500 is applied to the pressure receiving face 504, and overcomes the biasing force of the spring 520 to displace the spool 518 to the left-hand end position in FIG. 2, thereby bringing the hydraulic line 156 into communication with the exhaust port. The hydraulic pressure introduced into the hydraulic line 604 is introduced into a right-hand end hydraulic pressure chamber of the first fail-safe valve 600 and into a space between the lands 712 and 706 of the second fail-safe valve 700. This displaces the spool 636 and 732 of the respective fail-safe valves 600 and 700 to their respective left-hand end positions in FIG. 2, thereby bringing the hydraulic line 410 into communication with the hydraulic line 638 and bringing the hydraulic line 416 into communication with the hydraulic line 640. In the meantime, all of the first through fourth solenoid valves 400A, 400B, 400C and 400D are maintained in their respective OFF or deenergized positions.

As the driver operates the selector lever to select the D4 position, the manually operated valve 300 is moved to the D position to cause the land 310 to intercept the hydraulic line 324. This brings the hydraulic line 144 into communication with the hydraulic line 322 so that the hydraulic pressure in the right-hand end hydraulic pressure chamber of the pressure regulating valve 100 is discharged through the hydraulic line 322 and the exhaust line 320. The hydraulic line 88 is further brought into communication also with the hydraulic line 316 through the space between the lands 304 and 306 of the manually operated valve 300 so that the hydraulic pressure in the hydraulic line 316 is introduced into the space between the lands 112 and 118 of the pressure regulating valve 100 through the hydraulic line 152. The spool 138 is stabilized at a position where the forces acting upon the respective pressure receiving faces 110 and 114 and the respective pressure receiving faces 104 and 108 balance with the biasing force of the spring 140, to discharge a part of the hydraulic pressure in the hydraulic line 158 from the hydraulic lines 164 and 166, thereby regulating the hydraulic pressure in the hydraulic line 88 to a predetermined pressure (hereinafter, referred to as "second line pressure"), e.g., 10 kg/cm². The hydraulic pressure in the hydraulic line 316 is introduced into the second through fourth solenoid valves 400B, 400C and 400D, and is also introduced into the first solenoid valve 400A through the check valve 412 and the hydraulic line 414.

The hydraulic line 314 is maintained in communication with the hydraulic line 88, similarly to the case of the above-described N/P position.

As the selector lever is moved to the D4 position, signals are outputted from the electronic control system (not shown) to maintain the first through third solenoid valves 400A, 400B and 400C in their respective deenergized positions and to move the fourth solenoid valve 400D from the deenergized position to the energized position as indicated in the table 2, in order to bring the low/reverse brake 44 and the underdrive clutch 30 to their respective engaged positions to achieve shifting to the 1st gear ratio as indicated in the table 1. Only the first and third solenoid valves 400A and 400C are in their respective open positions where the hydraulic lines 414 and 410 are brought into communication with each other and the hydraulic lines 316 and 422 are brought into communication with each other.

The hydraulic pressure introduced into the hydraulic line 410 is introduced into the low/reverse brake 44 through a space between the lands 616 and 622 of the first fail-safe valve 600 and through the hydraulic line 638. The hydraulic pressure introduced into the hydraulic line 422 is introduced into the underdrive clutch 30 and into a space between the lands 724 and 730 of the second fail-safe valve 700 through the hydraulic line 736. On this occasion, if both the engaging means 44 and 30 are abruptly brought to their respective engaged positions with the relatively high second line pressure, shifting shocks might occur. By this reason, the first solenoid valve 400A is first energized at a predetermined duty ratio just before the low/reverse brake 44 is brought to its engaged position, and the third solenoid valve 400C is first energized at a predetermined duty ratio just before the underdrive clutch 30 is brought to its engaged position. Then, the duty ratios of the respective first and third solenoid valves 400A and 400C are gradually reduced, and the first and third solenoid valves 400A and 400C are finally deenergized. In this manner, the hydraulic pressures in the respective hydraulic lines 638 and 422 rise gradually. This makes it possible to reduce the above-mentioned shifting shocks.

As the vehicle starts to run, and as the electronic control system is operative in response to a throttle valve opening degree signal, a vehicle speed signal and the like to command to shift up into the 2nd gear ratio, signals are outputted from the electronic control system to energize the first, second and fourth solenoid valves 400A, 400B and 400D and to deenergize the third solenoid valve 400C, to bring the 2–4 brake 54 and the underdrive clutch 30 to their respective engaged positions as indicated in the table 1. Since the first solenoid valve 400A is switched from the deenergized position to the energized position, the hydraulic line 410 is brought into communication with the exhaust line 320 to discharge the hydraulic pressure from the hydraulic line 410, thereby releasing the low/reverse brake 44.

Since the second solenoid valve 400B is switched from the deenergized position to the energized position, the hydraulic line 316 is brought into communication with the hydraulic line 416. Thus, the hydraulic pressure introduced into the hydraulic line 416 is introduced into the 2-4 brake 54 through the space between the lands 712 and 718 of the second fail-safe valve 700 and through the hydraulic line 640, to bring the brake 54 to its engaged position. The hydraulic pressure in the hydraulic line 640 is also introduced into a space between the lands 628 and 634 of the first fail-safe valve 600 through the hydraulic line 644. Since, however, the hydraulic pressure having acted upon the space between the lands 616 and 622 has been reduced, the resultant force, to the right in FIG. 2, of the hydraulic pressure introduced into the space between the lands 616 and 622 and acting upon the pressure receiving faces 626 and 630 cannot overcome the biasing force to the left in FIG. 2 due to the second line pressure acting upon the pressure receiving face 606 of the land 610. Thus, the spool 636 is maintained at the position on the left-hand side in FIG. 2. Like the above-mentioned first and third solenoid valves 400A and 400C, if the second solenoid valve 400B is abruptly energized, the 2-4 brake 54 is suddenly brought to its engaged position, so that shifting shocks might occur. Accordingly, the duty ratio of the solenoid valve 400B is gradually varied to gradually raise the hydraulic pressure in the hydraulic line 416 such that the hydraulic pressure in the hydraulic line 416 finally reaches the second line pressure. This makes it possible to reduce the shifting shocks.

Since the third solenoid valve 400C is maintained deenergized, the hydraulic line 316 communicates with the hydraulic line 422 so that the underdrive clutch 30 is maintained engaged, like the case of the 1st gear ratio.

Since the fourth solenoid valve 400D is maintained energized to bring the hydraulic line 424 into communication with the exhaust line 320, so that the overdrive clutch 28 is maintained released.

As the vehicle speed further increases, and as the electronic control system commands to shift up from the 2nd gear ratio into the 3rd gear ratio, signals are outputted from the electronic control system to energize the first solenoid valve 400A and to deenergize the second through fourth solenoid valves 400B, 400C and 400D, to bring the underdrive clutch 30 and the overdrive clutch 28 to their respective engaged positions as indicated in the table 1.

Since the first solenoid valve 400A is maintained energized, the hydraulic line 410 is brought into communication with the exhaust line 320, like the case of the 2nd gear ratio.

Since the second solenoid valve 400B is switched from the energized position to the deenergized position, the hydraulic line 416 is brought into communication with the exhaust 320, thereby releasing the 2-4 brake 54.

Since the third solenoid valve 400C is maintained deenergized, the hydraulic line 422 is retained in communication with the hydraulic line 316, so that the underdrive clutch 30 is maintained engaged.

Since the fourth solenoid valve 400D is switched from the energized position to the deenergized position, the hydraulic line 316 is brought into communication with the hydraulic line 424. The hydraulic pressure introduced into the hydraulic line 424 is introduced into the overdrive clutch 28 to bring the same to its engaged position. The hydraulic pressure in the hydraulic line 424 is further introduced into the left-hand end hydraulic pressure chamber of the line pressure switching valve 500 through the hydraulic line 512a, and into the respective left-hand end hydraulic pressure chambers of the first and second fail-safe valve 600 and 700 through the hydraulic line 512b. The hydraulic pressure introduced into the left-hand end hydraulic pressure chamber of the line pressure switching valve 500 is applied to the pressure receiving face 514 and cooperates with the biasing force of the spring 520 to overcome the hydraulic pressure acting on the pressure receiving face 504 of the land 508, thereby displacing the spool 518 to the right in FIG. 2 to bring the hydraulic line 512a into communication with the hydraulic line 156. The hydraulic pressure introduced from the hydraulic line 512a into the hydraulic line 156 is introduced into the space between the lands 118 and 124 of the pressure regulating valve 100 and is applied to the pressure receiving faces 116 and 120. Thus, the spool 138 of the pressure regulating valve 100 is stabilized at a position where the forces acting respectively upon the pressure receiving faces 116 and 120, the pressure receiving faces 110 and 114 and the pressure receiving faces 104 and 108 balance with the biasing force of the spring 140. In this stabilized position, a part of the hydraulic pressure in the hydraulic line 158 is discharged from the hydraulic lines 164 and 166, so that the hydraulic pressure in the hydraulic line 88 is regulated to a predetermined pressure (hereinafter, referred to as "third line pressure") which is lower than the second line pressure, but is higher than the first line pressure.

The hydraulic pressure introduced into the left-hand end hydraulic pressure chamber of the first fail-safe valve 600 is applied to the pressure receiving face 632 of the land 634, but cannot overcome the hydraulic pressure introduced into the right-hand end hydraulic pressure chamber of the valve 600 through the hydraulic line 604 and acting upon the pressure receiving face 606, because of the difference in area between the pressure receiving faces 632 and 606. Accordingly, the spool 636 is maintained at the position on the left-hand side in FIG. 2.

The hydraulic pressure introduced into the left-hand end hydraulic pressure chamber of the second fail-safe valve 700 is applied to the pressure receiving face 728 of the land 730. The hydraulic pressure acting upon the pressure receiving face 728 cooperates with the hydraulic pressure introduced into the space between the lands 724 and 730 through the hydraulic line 736 and acting upon the pressure receiving faces 722 and 726, to bias the spool 732 to the right as viewed in FIG. 2. However, the biasing force to the right is lower than the biasing force to the left due to the hydraulic pressure which is introduced into the space between the lands 706 and 712 through the hydraulic line 604 and which acts upon the pressure receiving faces 704 and 708. Accordingly, the spool 732 is maintained at the position on the left-hand side in FIG. 2.

As the vehicle speed further increases, and as the electronic control system commands to shift up from the 3rd gear ratio into the 4th gear ratio, signals are outputted from the electronic control system to energize the first through third solenoid valves 400A, 400B and 400C and to deenergize the fourth solenoid valve 400D, to bring the 2-4 brake 54 and the overdrive clutch 28 to their respective engaged positions as indicated in the table 1. Since the first solenoid valve 400A is maintained energized, the hydraulic line 410 is brought into communication with the exhaust line 320, like the case of the 3rd gear ratio.

Since the second solenoid valve 400B is switched from the deenergized position to the energized position, the hydraulic line 316 is brought into communication with the hydraulic line 416. Accordingly, the hydraulic pressure in the hydraulic line 416 is introduced into the 2-4 brake 54 through the space between the lands 712 and 718 of the second fail-safe valve 700 and through the hydraulic line 640, thereby bringing the 2-4 brake 54 to its engaged position. At the same time, the hydraulic pressure in the hydraulic line 416 is introduced into the space between the lands 628 and 634 of the first fail-safe valve 600 through the hydraulic line 644, and is applied to the pressure receiving faces 626 and 630.

Since the third solenoid valve 400C is switched from the deenergized position to the energized position, the hydraulic line 422 is intercepted from communication with the hydraulic line 316, but is brought into communication with the exhaust line 320, so that the hydraulic pressure in the hydraulic line 736 is discharged and, simultaneously, the underdrive clutch 30 is released.

Since the fourth solenoid valve 400D is maintained deenergized so that the hydraulic line 424 is retained in communication with the hydraulic line 316, the overdrive clutch 28 is maintained engaged. Thus, the hydraulic pressure continues to be introduced into the left-hand end hydraulic chamber of the line pressure switching valve 500 to maintain the hydraulic pressure in the hydraulic line 88 at the second line pressure. The hydraulic pressure also continues to be introduced into the left-hand end hydraulic pressure chamber of the first fail-safe valve 600 and into the left-hand end hydraulic pressure chamber of the second fail-safe valve 700.

In the state in which shifting into the 4th gear ratio has been achieved, the hydraulic pressure is introduced into the left-hand end hydraulic pressure chamber of the first fail-safe valve 600 and into the space between the lands 628 and 634. Accordingly, because the sum of the pressure receiving areas of the respective pressure receiving faces 632, 626 and 630 is larger than that of the pressure receiving face 606 under consideration of the hydraulic pressure acting direction, the hydraulic pressures acting respectively upon the pressure receiving faces 632, 626 and 630 overcome the hydraulic pressure acting upon the pressure receiving face 606, to displace the spool 636 to the right in FIG. 2, thereby bringing the hydraulic line 638 into communication with the exhaust line 320.

The operation of shifting-up from the 1st gear ratio to the 2nd gear ratio, from the 2nd gear ratio to the 3rd gear ratio and from the 3rd gear ratio to the 4th gear ratio has been described above. The operation of shifting-down from the 4th gear ratio to the 3rd gear ratio, from the 3rd gear ratio to the 2nd gear ratio and from the 2nd gear ratio to the 1st gear ratio is merely carried out in the steps of procedure completely reverse to those described above, and the description of the shifting-down will therefore be omitted.

In addition, when the selector lever is moved to one of the D3, D2 and L positions, a speed range corresponding to the selected position is merely determined by the commands from the electronic control system. The manually operated valve 300 is maintained at the D position, and no change occurs in the hydraulic circuit. Thus, the description of the case where the selector lever is moved to one of the D3, D2 and L positions will therefore be omitted.

As the driver moves the selector lever to the R position, the spool 302 of the manually operated valve 300 is also moved to the R position, so that the hydraulic line 144 is brought into communication with the exhaust line 320 through the space between the lands 306 and 308, the hydraulic line 322 and the right-hand end hydraulic pressure chamber 323 of the manually operated valve 300. In addition, the hydraulic line 316 is also brought into communication with the exhaust line 320 through the right-hand end hydraulic pressure chamber 323. Accordingly, introduced into the pressure regulating valve 100 is only the hydraulic pressure which is introduced into the space between the lands 106 and 112 of the pressure regulating valve 100 and which is applied to the pressure receiving faces 104 and 108. This stabilizes the spool 138 at a position where the hydraulic pressure acting upon the pressure receiving faces 104 and 108 balances with the biasing force of the spring 140, so that the hydraulic pressure in the hydraulic line 88 is regulated to a predetermined highest pressure (hereinafter, referred to as "forth line pressure"), e.g., 16 kg cm$^2$. Moreover, the hydraulic line 88 is brought into communication with the hydraulic lines 314 and 328 through the space between the lands 304 and 306 of the manually operated valve 300. The hydraulic pressure introduced into the hydraulic line 314 is introduced into the line pressure switching valve 500, and into the first and second fail-safe valves 600 and 700 through the hydraulic line 604, like the case where the shifting into the forward gear ratios is achieved. The hydraulic pressure introduced into the hydraulic line 328 is introduced into the reverse clutch 32 to bring the same to its engaged position, and is also introduced into the check valve 412. As the selector lever is moved to the R position, the first solenoid valve 400A is brought to its deenergized position, as indicated in the table 1. Accordingly, the hydraulic pressure introduced into the check valve 412 is introduced into the low/reverse brake 44 through the hydraulic line 414, the hydraulic line 410, the space between the lands 616 and 622 of the first fail-safe valve 600, and the hydraulic line 638, thereby bringing the brake 44 to its engaged position. Thus, shifting into the reverse gear ratio is achieved.

As described above, the arrangement of the hydraulic control system illustrated in FIG. 2 is such that the hydraulic pressure in the hydraulic line 88 is switched to the lowest first line pressure at the neutral, to the relatively high second line pressure at achievement of shifting into the 1st and 2nd gear ratios, to the relatively low third line pressure higher than the first line pressure, but lower than the second line pressure at achievement of shifting into the 3rd and 4th gear ratios, and to the highest fourth line pressure at achievement of shifting into the reverse gear ratio. The arrangement minimizes power losses due to driving of the pump 86 during the neutral in which the engine torque is not transmitted to the output shaft of the transmission. In addition, by the arrangement, the line pressure is relatively raised during shifting to the 1st and 2nd gear ratios in which relatively high torque is transmitted, to relatively increase the engaging forces of the respective engaging means, thereby preventing slippage. Further, since the transmission torque is relatively low during shifting to the 3rd and 4th gear ratios, the arrangement sets the line pressure to the relatively low level to reduce losses of the power for driving the pump 86. Moreover, by the arrangement, the line pressure is maximized during shifting to the reverse gear ratio in which the transmission torque is the maximum, to prevent slippage of the engaging means.

The first through fourth solenoid valves 400A, 400B, 400C and 400D are duty-controlled to control the hydraulic pressures supplied to and discharged from the respective engaging means corresponding respectively to the solenoid valves, thereby enabling smooth shifting of gear ratios to be achieved.

The operation of the first and second fail-safe valves 600 and 700, when malfunction occurs in the electronic control system or in at least one of the solenoid valves so that any one or more solenoid valve or valves operates or operate in error, will next be described.

The state will first be considered, where the first through third solenoid valves 40A, 400B and 400C are not energized and the fourth solenoid valve 400D is energized so that shifting into the 1st gear ratio should be achieved. In such state, if the second solenoid valve 400B malfunctions and is energized, the hydraulic line 316 is brought into communication with the hydraulic line 416. This causes the hydraulic pressure introduced into the hydraulic line 416 to be introduced into the 2-4 brake 54 through the space between the lands 712 and 718 of the second fail-safe valve 700, to bring the brake 54 to its engaged position. At the same time, however, the hydraulic pressure in the hydraulic line 416 is also introduced into the space between the lands 628 and 634 of the first fail-safe valve 600 through the hydraulic lines 640 and 644. Accordingly, the biasing force to the right due to the hydraulic pressures acting upon the respective pressure receiving faces 614 and 618 and, in addition thereto, the biasing force to the right due to the hydraulic pressures acting upon the respective pressure receiving faces 626 and 630 are applied to the spool 636, and overcome the biasing force to the left due to the hydraulic pressure acting upon the pressure receiving face 606, so that the spool 636 is moved to the position on the right-hand side in FIG. 2. Thus, the hydraulic line 638 is brought into communication with the exhaust line 320. This releases the low/reverse brake 44, and brings only the 2-4 brake 54 and the underdrive clutch 30 to their respective engaged positions, so that shifting into the 2nd gear ratio is achieved.

If the fourth solenoid valve 400D malfunctions and is deenergized in the state in which shifting into the 1st gear ratio should be achieved, the hydraulic line 316 is brought into communication with the hydraulic line 424, so that the hydraulic pressure is introduced into the overdrive clutch 28 to bring the same to its engaged position. At the same time, the hydraulic pressure is introduced into the respective left-hand end hydraulic pressure chambers of the first and second fail-safe valves 600 and 700 through the hydraulic line 512b. Accordingly, the spool 636 of the first fail-safe valve 600 is moved to the position on the right-hand side in FIG. 2 under the biasing force due to the hydraulic pressures acting respectively upon the pressure receiving face 632 and the pressure receiving faces 614 and 618, in a manner like that described above. At this time, the spool 732 of the second fail-safe valve 700 is not switched to its discharge position on the right-hand side in FIG. 2. Since, however, the second solenoid valve 400B is deenergized and the hydraulic pressure is not supplied to the hydraulic line 416, the 2-4 brake 54 is not brought to its engaged position. Accordingly, the hydraulic line 638 leading to the low/reverse brake 44 is brought into communication with the exhaust line 320 and, therefore, the low/reverse brake 44 is released and only the underdrive clutch 30 and the overdrive clutch 28 are brought to their respective engaged positions. Thus, shifting into the 3rd gear ratio is achieved.

If the second solenoid valve 400B is energized and the fourth solenoid valve 400D is not energized in the state in which shifting into the 1st gear ratio should be achieved, the second solenoid valve 400B falls into a malfunction state in addition to malfunction of only the fourth solenoid valve 400D, so that the hydraulic line 316 is brought into communication with the hydraulic line 416. Accordingly, the hydraulic pressure is supplied to all of the hydraulic lines 410, 416, 422 and 424 communicating the solenoid valves respectively with the engaging means 28, 30, 44 and 54. Whereupon, the hydraulic pressure is applied to all of the pressure receiving face 728, the pressure receiving faces 722 and 726 and the pressure receiving faces 710 and 714 of the second fail-safe valve 700, to bias the spool 732 to the right. Thus, the spool 732 is switched to the position on the right-hand side in FIG. 2, to discharge the hydraulic pressure in the hydraulic line 640 through the exhaust line 320, so that the 2-4 brake 54 is maintained released. In addition, since the hydraulic pressures are applied respectively to the pressure receiving face 632 and the pressure receiving faces 614 and 618 of the first fail-safe valve 600, the biasing force to the right in FIG. 2 due to the hydraulic pressures acting respectively upon these pressure receiving faces becomes higher than that to the left in FIG. 2 due to the hydraulic pressure acting upon the pressure receiving face 606. Thus, the spool 636 is switched to the position on the right-hand side in FIG. 2, to bring the hydraulic line 638 into communication with the exhaust line 320, thereby maintaining the low/reverse brake 44 released. Accordingly, only the underdrive clutch 30 and the overdrive clutch 28 are brought to their respective engaged positions, so that shifting into the 3rd gear ratio is achieved.

The state will next be considered, where the first, second and fourth solenoid valves 400A, 400B and 400D are energized and the third solenoid valve 400C is not energized so that shifting into the 2nd gear ratio should be achieved. In such state, if the first solenoid valve 400A becomes deenergized, the hydraulic pressure is introduced to the pressure receiving faces 626 and 630 of the first fail-safe valve 600 through the hydraulic line 644 and, in addition thereto, the hydraulic line 316 is brought into communication with the hydraulic line 410. This causes the hydraulic pressure in the hydraulic line 410 to be introduced into the space between the lands 616 and 622 of the first fail-safe valve 600. Thus, the biasing force to the right in FIG. 2 due to these hydraulic pressures becomes higher than that to the left in FIG. 2 due to the hydraulic pressure acting upon the pressure receiving face 606, to move the spool 636 to the position on the right-hand side in FIG. 2. Accordingly, communication between the hydraulic lines 410 and 638 is intercepted, and the hydraulic line 638 is brought into communication with the exhaust line 320, so that only 2-4 brake 54 and the underdrive clutch 30 are maintained engaged. Thus, the 2nd gear ratio is maintained.

If the fourth solenoid valve 400D malfunctions and is deenergized in the state in which shifting into the 2nd gear ratio should be achieved, the hydraulic line 316 is brought into communication with the hydraulic line 424, so that the hydraulic pressure in the hydraulic line 424 is introduced into the overdrive clutch 28 to bring the same to its engaged position. At the same time, the hydraulic pressure is introduced into the respective left-hand end hydraulic pressure chambers of the first and second fail-safe valves 600 and 700 through the hydraulic line 512b. Whereupon, the hydraulic pressures are applied respectively to the pressure receiving face 728, the pressure receiving faces 722 and 726 and the pressure receiving faces 710 and 714 of the second fail-safe valve 700. Accordingly, the biasing force due to these hydraulic pressures causes the spool 732 to be moved to the position on the right-hand side in FIG. 2, so that the hydraulic line 640 is brought into communication with the exhaust line 320, thereby releasing the 2-4 brake 54. On the other hand, the hydraulic pressure is also introduced to the pressure receiving face 632 of the first fail-safe valve 600 through the hydraulic line 512b. However, by the aforesaid switching of the second fail-safe valve 700, the hydraulic pressure is not introduced into the space between the pressure receiving faces 626 and 630. In addition, the first solenoid valve 400A is energized so that the hydraulic pressure is not also introduced into the space between the pressure receiving faces 614 and 618. Accordingly, the spool 636 is maintained at the position on the left-hand side in FIG. 2, but the hydraulic pressure is not supplied to the low/reverse brake 44 so that the brake 44 is maintained released. Thus, the underdrive clutch 30 and the overdrive clutch 28 are brought to their respective engaged positions and, therefore, shifting into the 3rd gear ratio is achieved.

If both the first and fourth solenoid valves 400A and 400D are not energized in the state in which shifting into the 2nd gear ratio should be achieved, the spool 636 of the first fail-safe valve 600 and the spool 732 of the second fail-safe valve 700 are both moved to their respective positions on the right-hand side in FIG. 2. This brings both the hydraulic line 638 leading to the low/reverse brake 44 and the hydraulic line 640 leading to the 2-4 brake 54 into communication with the exhaust line 320, so that the brakes 44 and 54 are brought to their respective released positions and the underdrive clutch 30 and the overdrive clutch 28 are brought to their respective engaged positions. Thus, shifting into the 3rd gear ratio is achieved.

The state will next be considered, where the first solenoid valve 400A is energized and the second through fourth solenoid valves 400B, 400C and 400D are deenergized so that shifting into the 3rd ratio should be achieved. In such state, if the first solenoid valve 400A becomes deenergized, the hydraulic line 316 is brought into communication with the hydraulic line 410, so that the hydraulic pressure in the hydraulic line 410 is introduced into the space between the lands 616 and 622 of the first fail-safe valve 600. At this time, since the hydraulic pressure is also introduced to the pressure receiving face 632 through the hydraulic line 512b, the spool 636 is moved to the position on the right-hand side in FIG. 2, because of the relationship in pressure receiving area between the pressure receiving faces 632 and 606. This brings the hydraulic line 638 into communication with the exhaust line 320, so that the hydraulic pressure is not supplied to the brake 44. Accordingly, the low/reverse brake 44 and the 2-4 brake 54 are maintained released, and the underdrive clutch 30 and the overdrive clutch 28 are maintained engaged. Thus, the 3rd gear ratio is maintained.

If the second solenoid valve 400B is energized in the state in which shifting into the 3rd gear ratio should be achieved, the hydraulic line 316 is brought into communication with the hydraulic line 416, so that the hydraulic pressure is introduced into the space between the lands 712 and 718 of the second fail-safe valve 700. At this time, since the hydraulic pressures are also applied respectively to the pressure receiving face 728 and the pressure receiving faces 722 and 726, the spool 732 is moved to the position on the right-hand side in FIG. 2 in a manner like that described above. This brings the hydraulic line 640 leading to the 2-4 brake 54 into communication with the exhaust line 320, so that the hydraulic pressure is not supplied to the brake 54. Thus, the 3rd ratio is maintained in a manner like that described above.

If the first solenoid valve 400A becomes deenergized and the second solenoid valve 400B becomes energized in the state in which shifting into the 3rd gear ratio should be achieved, the spool 636 of the first fail-safe valve 600 and the spool 732 of the second fail-safe valve 700 are both moved to their respective positions on the right-hand side in FIG. 2. The hydraulic lines 638 and 640 are brought into communication with the exhaust line 320, so that the hydraulic pressure is not supplied to the brakes 44 and 54. Thus, the 3rd gear ratio is maintained.

The state will next be considered, where the first through third solenoid valves 400A, 400B and 400C are energized and the fourth solenoid valve 400D is deenergized so that shifting into the 4th gear ratio should be achieved. In such state, if the first solenoid valve 400A becomes deenergized, the hydraulic line 316 is brought into communication with the hydraulic line 410. In the 4th gear ratio, however, the spool 636 of the first fail-safe valve 600 is beforehand moved to the position on the right-hand side in FIG. 2, because of the hydraulic pressures acting respectively upon the pressure receiving face 632 and the pressure receiving faces 626 and 630. Accordingly, the hydraulic pressure in the hydraulic line 410 is not supplied to the low/reverse brake 44, so that only the 2-4 brake 54 and the overdrive clutch 28 are maintained engaged. Thus, the 4th gear ratio is maintained.

If the third solenoid valve 400C becomes deenergized in the state in which shifting into the 4th gear ratio should be achieved, the hydraulic line 316 is brought into communication with the hydraulic line 422, so that the hydraulic pressure is introduced into the underdrive clutch 30 to bring the same to its engaged position. In addition, the hydraulic pressure is introduced into the space between the lands 724 and 730 of the second fail-safe valve 700 through the hydraulic line 736. Accordingly, the hydraulic pressures are applied respectively to all of the pressure receiving faces 722 and 726, the pressure receiving face 728 and the pressure receiving faces 710 and 714 of the second fail-safe valve 700. This causes the spool 732 of the second fail-safe valve 700 to be switched to the position on the right-hand side in FIG. 2, to bring the hydraulic line 640 into communication with the exhaust line 320, so that the 2-4 brake 54 is released and only the underdrive clutch 30 and the overdrive clutch 28 are brought to their respective engaged positions. Thus, shifting into the 3rd gear ratio is achieved.

If the first and third solenoid valves 400A and 400C become deenergized in the state in which shifting into the 4th gear ratio should be achieved, both the hydraulic lines 410 and 422 are brought into communication with the hydraulic line 316. However, the spool 636 of the first fail-safe valve 600 has already been switched to the position on the right-hand side in FIG. 2, and the spool 732 of the second fail-safe valve 700 is switched to the position on the right-hand side in FIG. 2 at the same time the hydraulic pressure is supplied to the hydraulic line 422 leading to the underdrive clutch 30. Accordingly, the 2-4 brake 54 is released, and only the underdrive clutch 30 and the overdrive clutch 28 are brought into their respective engaged positions. Thus, shifting into the 3rd gear ratio is achieved.

The illustrated embodiment comprises the first and second fail-safe valves 600 and 700 and is arranged such that when three or more engaging means tend to be simultaneously brought to their respective engaged positions, other engaging means are released leaving two engaging means in their respective engaged positions. Thus, the illustrated embodiment is effective in that such a situation can be prevented in which three or more engaging means are simultaneously brought to their respective engaged positions so that the transmission mechanism is locked to suddenly lock the wheels of the vehicle from rotation or to cause the vehicle to become entirely unable to run.

In addition, the arrangement of the illustrated embodiment is such that the solenoid valves are provided correspondingly to the respective engaging means. With such arrangement, duty control of the respective solenoid valves enables the hydraulic pressures supplied to and discharged from the respective engaging means to be controlled with a high accuracy, making it possible to reduce shifting shocks.

Further, the arrangement of the illustrated embodiment is such that the three-way valves of ball valve type are employed as the first through fourth solenoid valves as shown in FIG. 2, and the total number of the spool valves in the hydraulic control system is less than that of the conventional automatic transmission. Thus, it is possible to minimize the probability that the solenoid valves and the spool valves become stuck.

Moreover, the arrangement of the illustrated embodiment is such that the hydraulic pressure in the hydraulic line 88 is regulated to the first line pressure by the pressure regulating valve 100 when the manually operated valve 300 is in the N/P position. Such arrangement is effective in that even if the rotational speed of the engine rises at the neutral, the hydraulic pressure in the hydraulic line 88 does not rise more than necessary, making it possible to prevent noises from being generated.

Furthermore, the arrangement of the illustrated embodiment is such that the line pressure switching valve 500 is provided by which the hydraulic pressure is regulated to the relatively high second line pressure when shifting into the 1st and 2nd gear ratios are achieved, and the hydraulic pressure is regulated to the relatively low third line pressure when shifting into the 3rd and 4th gear ratios are achieved. With such arrangement, the engaging forces of the respective engaging means can be brought to their respective levels corresponding to the magnitude of the transmission torque, making it possible to restrain losses of the engine output for driving the pump 86 to the minimum.

The embodiment has been described as having the first fail-safe valve 600 provided in the hydraulic line communicating the first solenoid valve 400A and the low/reverse brake 44 with each other, and the second fail-safe valve 700 provided in the hydraulic line communicating the second solenoid valve 400B and the 2-4 brake 54 with each other. However, the invention should not be limited to this specific form. That is, if three or more engaging means can be prevented from being simultaneously brought to their respective engaged positions, the first fail-safe valve 600 may be provided in any one of the hydraulic line communicating the first solenoid valve 400A and the low/reverse brake 44 with each other, the hydraulic line communicating the second solenoid valve 400B and the 2-4 brake 54 with each other, and the hydraulic line communicating the fourth solenoid valve 400D and the overdrive clutch 28 with each other. Further, the second fail-safe valve 700 may be provided in any one of the hydraulic line communicating the second solenoid valve 400B and the 2-4 brake 54 with each other, the hydraulic line communicating the third solenoid valve 400C and the underdrive clutch 30 with each other, and the hydraulic line communicating the fourth solenoid valve 400D and the overdrive clutch 28 with each other. The second fail-safe valve 700 should not be provided in the hydraulic line in which the first fail-safe valve 600 is provided. In this case, there can also be obtained advantages similar to those of the illustrated embodiment.

Further, in the illustrated embodiment, since the first and second fail-safe valves serving respectively as first and second switching valves are spool valves, the pressure receiving faces of the spool valves are utilized as detecting means for detecting the hydraulic pressures in the respective hydraulic lines communicating the solenoid valves respectively with the engaging means, and as switching means for switching the spool valves. However, the invention should not be limited to the specific form. That is, pressure sensors serving as detecting means may be provided respectively in the above-mentioned hydraulic lines, and fail-safe valves formed, for example, by electromagnetic switching valves or the like may be switched between their respective ON and OFF positions in response to the outputs from the respective sensors. Also in this case, advantages similar to those of the illustrated embodiment can be obtained.

Moreover, the arrangement of the first and second fail-safe valves 600 and 700 in the illustrated embodiment is such that the hydraulic pressure in the hydraulic passage means 604 is applied to the pressure receiving face 606 of the spool 636 and to the pressure receiving face 708 of the spool 732, to normally bias the spools 636 and 732 in the left-hand direction as viewed in FIG. 2. However, the invention should not be limited to this specific form. Spring force may be substituted for the hydraulic force, to normally bias the spools 636 and 732 in the left-hand direction as viewed in FIG. 2.

What is claimed is:

1. A hydraulic control system for a vehicle automatic transmission which comprises first and second engaging means respectively engagable for establishing different gear ratios, hydraulic pressure supplying means for supplying hydraulic pressure to cause engagement of each of said first and second engaging means, first hydraulic passage means for connecting said hydraulic pressure supplying means to said first engaging means, first shift means for switching supply and discharge of the hydraulic pressure to and from said first engaging means in accordance with running conditions of the vehicle, second hydraulic passage means for connecting said hydraulic pressure supplying means to said second engaging means, and second shift means for switching supply and discharge of the hydraulic pressure to and from said second engaging means in accordance with the running conditions of the vehicle, said hydraulic control system comprising:

first pressure detecting means for detecting hydraulic pressure in said first hydraulic passage means between said first shift means and said first engaging means;

second pressure detecting means for detecting hydraulic pressure in said second hydraulic passage means between said second shift means and said second engaging means;

valve means coupled to said first hydraulic passage means between said first pressure detecting means and said first engaging means and being movable between a supply position where said valve means opens said first hydraulic passage means for supplying the hydraulic pressure to be supplied to said first engaging means and a discharge position where said valve means discharges the hydraulic pressure supplied to said first engaging means; and switching means coupled to said valve means for switching said valve means to move said valve means to said discharge position when said first pressure detecting means detects that the hydraulic pressure in said first hydraulic passage means is higher than a first predetermined value and said second pressure detecting means detects that the hydraulic pressure in said second hydraulic passage means is higher than a second predetermined value.

2. The hydraulic control system of claim 1, wherein said valve means comprises a spool valve which includes a spool movable between supply and discharge positions which correspond respectively with said supply and discharge positions of said valve means and normally biased toward said supply position under a predetermined force, and a plurality of lands integrally formed on said spool, said lands having their respective pressure receiving sections including a first pressure receiving section having applied thereto the hydraulic pressure supplied from said first shift means to said first engaging means, for biasing said spool toward said discharge position thereof, and a second pressure receiving section having applied thereto the hydraulic pressure supplied from said second shift means to said second engaging means, for biasing said spool toward said discharge position thereof, said spool being switched to said discharge position thereof when the hydraulic pressure acting upon said first pressure receiving section exceeds said first predetermined value and the hydraulic pressure acting upon said second pressure receiving section exceeds said second predetermined value.

3. The hydraulic control system of claim 2, wherein said pressure receiving sections of the respective lands further includes a third pressure receiving section having normally applied thereto hydraulic pressure of a predetermined magnitude, for biasing said spool toward said supply position thereof.

4. The hydraulic control system of claim 3, wherein said predetermined magnitude of the hydraulic pressure normally acting upon said third pressure receiving section, and said first and second predetermined values are substantially equal to each other, said third pressure receiving section having an effective pressure receiving area larger than that of each of said first and second pressure receiving sections, but smaller than a sum of the pressure receiving areas of said respective first and second pressure receiving sections.

5. A hydraulic control system for a vehicle automatic transmission which comprises first, second and third engaging means, said engaging means being combined to form a plurality of sets of pairs, the engaging means in each set being simultaneously engaged to enable shifting into a plurality of gear ratios corresponding in number to said sets to be achieved, hydraulic pressure supplying means for supplying hydraulic pressure to cause engagement of each of said first, second and third engaging means respectively, first hydraulic passage means for connecting said hydraulic pressure supplying means to said first engaging means, first shift means coupled to said first hydraulic passage means for switching supply and discharge of the hydraulic pressure to and from said first engaging means in accordance with running conditions of the vehicle, second hydraulic passage means for connecting said hydraulic pressure supplying means to said second engaging means, second shift means coupled to said second hydraulic passage means for switching supply and discharge of the hydraulic pressure to and from said second engaging means in accordance with the running conditions of the vehicle, third hydraulic passage means connecting said hydraulic pressure supplying means to said third engaging means, and third shift means coupled to said third hydraulic passage means for switching supply and discharge of the hydraulic pressure to and from said third engaging means in accordance with the running conditions of the vehicle, said hydraulic control system comprising:

first pressure detecting means for detecting hydraulic pressure in said first hydraulic passage means between said first shift means and said first engaging means;

second pressure detecting means for detecting hydraulic pressure in said second hydraulic passage means between said second shift means and said second engaging means;

third pressure detecting means for detecting hydraulic pressure in said third hydraulic passage means between said third shift means and said third engaging means;

valve means coupled to said first hydraulic passage means between said first pressure detecting means and said first engaging means and being movable between a supply position where said valve means opens said first hydraulic passage means for supplying the hydraulic pressure to be supplied to said first engaging means and a discharge position where said valve means discharges the hydraulic pressure supplied to said first engaging means; and switching means coupled to said valve means for switching said valve means to move said valve means to said discharge position when said first pressure detecting means detects that the hydraulic pressure in said first hydraulic passage means is higher than a first predetermined value, said second pressure detecting means detects that the hydraulic pressure in said second hydraulic passage means is higher than a second predetermined value, and said third pressure detecting means detects that the hydraulic pressure in said third hydraulic passage means is higher than a third predetermined value.

6. The hydraulic control system of claim 5, wherein said valve means comprises a spool valve which includes a spool movable between supply and discharge positions which correspond respectively with said supply and discharge positions of said valve means and normally biased toward said supply position thereof under a predetermined force, and a plurality of lands integrally formed on said spool, said lands having their respective pressure receiving sections including a first pressure receiving section having applied thereto the hydraulic pressure supplied from said first shift means to said first engaging means, for biasing said spool toward said discharge position thereof, a second pressure receiving section having applied thereto the hydraulic pressure supplied from said second shift means to said second engaging means, for biasing said spool toward said discharge position thereof, and a third pressure receiving section having applied thereto the hydraulic pressure supplied from said third shift means to said third engaging means, for biasing said spool toward said discharge position thereof, said spool being moved to said discharge position thereof when the hydraulic pressure acting upon said first pressure receiving section exceeds said first predetermined value, the hydraulic pressure acting upon said second pressure receiving section exceeds said second predetermined value, and the hydraulic pressure acting upon said third pressure receiving section exceeds said third predetermined value.

7. The hydraulic control system of claim 6, wherein said pressure receiving sections of the respective lands further includes a fourth pressure receiving section having normally applied thereto hydraulic pressure of a predetermined magnitude, for biasing said spool toward said supply position thereof.

8. The hydraulic control system of claim 7, wherein said predetermined magnitude of the hydraulic pressure normally acting upon said fourth pressure receiving section, and said first, second and third predetermined values are substantially equal to each other, said fourth pressure receiving section having an effective pressure receiving area larger than a sum of respective effective pressure receiving areas of any two of said first, second and third pressure receiving sections, but smaller than a total sum of the pressure receiving areas of said respective first, second and third pressure receiving sections.

9. A hydraulic control system for a vehicle automatic transmission which comprises first, second and third engaging means respectively engagable for achieving three different forward gear ratios, fourth engaging means engagable when achieving each of said three forward gear ratios, hydraulic pressure supplying means for supplying hydraulic pressure to cause engagement of each of said first, second, third and fourth engaging means respectively, first hydraulic passage means for connecting said hydraulic pressure supplying means to said first engaging means, first shift means coupled to said first hydraulic passage means for switching supply and discharge of the hydraulic pressure to and from said first engaging means in accordance with running conditions of the vehicle, second hydraulic passage means for connecting said hydraulic pressure supplying means to said second engaging means, second shift means coupled to said second hydraulic passage means for switching supply and discharge of the hydraulic pressure to and from said second engaging means in accordance with the running conditions of the vehicle, third hydraulic passage means for connecting said hydraulic pressure supplying means to said third engaging means, third shift means coupled to said third hydraulic passage means for switching supply and discharge of the hydraulic pressure to and from said third engaging means in accordance with the running conditions of the vehicle, and fourth hydraulic passage means for connecting said hydraulic pressure supplying, means to said fourth engaging means, said hydraulic control system comprising:

first pressure detecting means for detecting hydraulic pressure in said first hydraulic passage means between said first shift means and said first engaging means;

second pressure detecting means for detecting hydraulic pressure in said second hydraulic passage means between said second shift means and said second engaging means;

third pressure detecting means for detecting hydraulic pressure in said third hydraulic passage means between said third shift means and said third engaging means;

fourth pressure detecting means for detecting hydraulic pressure in said fourth hydraulic passage means;

first valve means provided in a portion of any one of said first, second and third hydraulic passage means, said portion thereof extending between the pressure detecting means coupled to the hydraulic passage means and the engaging means connected to the hydraulic passage means, said first valve means being movable between a supply position where said first valve means opens the hydraulic passage means for supplying the hydraulic pressure to be supplied to the engaging means and a discharge position where said first valve means discharges the hydraulic pressure supplied to the engaging means;

second valve means provided in a portion of any one of said second, third and fourth hydraulic passage means in which hydraulic passage means said first valve means is not provided, said portion thereof extending between the pressure detecting means coupled to the hydraulic passage means and the engaging means connected to the hydraulic passage means, said second valve means being movable between a supply position where said second valve means opens the hydraulic passage means for supplying the hydraulic pressure to be supplied to the engaging means and a discharge position where said second valve means discharges the hydraulic pressure supplied to the engaging means;

first switching means coupled to said first valve means for switching said first valve means to move said first valve means to said discharge position when the pressure detecting means coupled to the hydraulic passage means having provided therein said first valve means among said first, second and third hydraulic passage means detects that the hydraulic pressure in the hydraulic passage means is higher than a predetermined value and the pressure detecting means coupled to at least one of the remaining hydraulic passage means detects that the hydraulic pressure in the hydraulic passage means is higher than a predetermined value; and second switching means coupled to said second valve means for switching said second valve means to move said second valve means to said discharge position when the pressure detecting means coupled respectively to said second, third and fourth hydraulic passage means detect simultaneously that the hydraulic pressures in the respective hydraulic passage means are higher than their respective predetermined values.

10. A hydraulic control system for a vehicle automatic transmission which comprises first, second, third and fourth engaging means for establishing different forward gear ratios, hydraulic pressure supplying means for supplying hydraulic pressure to cause engagement of each of said first, second, third and fourth engaging means respectively, first hydraulic passage means for connecting said hydraulic pressure supplying means to said first engaging means, first shift means coupled to said first hydraulic passage means for switching supply and discharge of the hydraulic pressure to and from said first engaging means in accordance with running conditions of the vehicle, second hydraulic passage means for connecting said hydraulic pressure supplying means to said second engaging means, second shift means coupled to said second hydraulic passage means for switching supply and discharge of the hydraulic pressure to and from said second engaging means in accordance with the running conditions of the vehicle, third hydraulic passage means for connecting said hydraulic pressure supplying means to said third engaging means, third shift means coupled to said third hydraulic passage means for switching supply and discharge of the hydraulic pressure to and from said third engaging means in accordance with the running conditions of the vehicle, fourth hydraulic passage means for connecting said hydraulic pressure supplying means to said fourth engaging means, and fourth shift means coupled to said fourth hydraulic passage means for switching supply and discharge of the hydraulic pressure to and from said fourth engaging means, the arrangement being such that a first gear ratio is achieved when said first and fourth engaging means are simultaneously engaged, a second gear ratio is achieved when said second and fourth engaging means are simultaneously engaged, a third gear ratio is achieved when said third and fourth engaging means are simultaneously engaged, a fourth gear ratio is achieved when said second and third engaging means are simultaneously engaged, said hydraulic control system comprising:

first pressure detecting means for detecting hydraulic pressure in said first hydraulic passage means between said first shift means and said first engaging means;

second pressure detecting means for detecting hydraulic pressure in said second hydraulic passage means between said second shift means and said second engaging means;

third pressure detecting means for detecting hydraulic pressure in said third hydraulic passage means between said third shift means and said third engaging means;

fourth pressure detecting means for detecting hydraulic pressure in said fourth hydraulic passage means between said fourth shift means and said fourth engaging means;

first valve means provided in a portion of any one of said first, second and third hydraulic passage means, said portion thereof extending between the pressure detecting means coupled to the hydraulic passage means and the engaging means connected to the hydraulic passage means, said first valve means being movable between a supply position where said first valve means opens the hydraulic passage means for supplying the hydraulic pressure to be supplied to the engaging means and a discharge position where said first valve means discharges the hydraulic pressure supplied to the engaging means;

second valve means provided in a portion of any one of said second, third and fourth hydraulic passage means in which hydraulic passage means said first valve means is not provided, said portion thereof extending between the pressure detecting means coupled to the hydraulic passage means and the engaging means connected to the hydraulic passage means, said second valve means being movable between a supply position where said second valve means opens the hydraulic passage means for supplying the hydraulic pressure to be supplied to the engaging means and a discharge position where said second valve means discharges the hydraulic pressure supplied to the engaging means;

first switching means coupled to said first valve means for switching said first valve means to move said first valve means to said discharge position thereof when the pressure detecting means coupled to the hydraulic passage means having provided therein said first valve means detects that the hydraulic pressure in the hydraulic passage means is higher than a predetermined value and the pressure detecting means coupled to at least one of the remaining hydraulic passage means detects that the hydraulic pressure in the hydraulic passage means is higher than a predetermined value; and second switching means coupled to said second valve means for switching said second valve means to novel said second valve means to said discharge position when the pressure detecting means coupled respectively to said second, third and fourth hydraulic passage means simultaneously detect that the hydraulic pressures in the respective hydraulic passage means are higher than their respective predetermined values.

11. The hydraulic control system of claim 10, wherein said third gear ratio is a directly coupled gear ratio in which an input shaft and an output shaft of the transmission are substantially equal in rotational speed to each other, and said fourth gear ratio is an overdrive gear ratio in which said output shaft is higher in rotational speed than said input shaft.

* * * * *